(12) United States Patent
Le et al.

(10) Patent No.: US 7,266,100 B2
(45) Date of Patent: Sep. 4, 2007

(54) SESSION UPDATING PROCEDURE FOR AUTHENTICATION, AUTHORIZATION AND ACCOUNTING

(75) Inventors: Yanqun Le, Beijing (CN); Qing Liu, Beijing (CN); Dan Forsberg, Espoo (FI)

(73) Assignee: Nokia Corporation, Espoo (FI)

( * ) Notice: Subject to any disclaimer, the term of this patent is extended or adjusted under 35 U.S.C. 154(b) by 1069 days.

(21) Appl. No.: 10/285,416

(22) Filed: Nov. 1, 2002

(65) Prior Publication Data

US 2004/0085942 A1 May 6, 2004

(51) Int. Cl.
*H04Q 7/00* (2006.01)
(52) U.S. Cl. .................. 370/331; 370/278; 455/436
(58) Field of Classification Search ............. 370/330, 370/331, 329, 328, 338, 278; 455/456.1; 379/88.17; 709/203
See application file for complete search history.

(56) References Cited

U.S. PATENT DOCUMENTS

| | | | |
|---|---|---|---|
| 2002/0080752 A1* | 6/2002 | Johansson et al. | 370/338 |
| 2004/0259567 A1* | 12/2004 | Valko et al. | 455/456.1 |
| 2005/0188065 A1* | 8/2005 | O'Rourke et al. | 709/223 |
| 2005/0286466 A1* | 12/2005 | Tagg et al. | 370/329 |

OTHER PUBLICATIONS

D. Forsberg, Context Relocation of AAA Parameters in IP Networks draft-forsberg seamoby-aaa-relocate-00.txt, Seamoby Working Group, Internet Draft, Feb. 22, 2002, pp. 1-11.
P. Calhoun, "Diameter Mobile IPv4 Application" AAA Working Group, Internet Draft, Category: Standards Track, Jun. 2002, pp. 1-49.
P. Calhoun, AAA Working Group, Internet-Draft, Category: Standards Track, Jul. 2002, pp. 1-143.
Y. Bejerano et al "An Anchor Chain Scheme for IP Mobility Management", IEEE INFOCOM 2000, 19th Annual Joint Conf. Of the IEEE Computer and Communications Societies, Proceedings, IEEE Tel Aviv, Israel Mar. 26-30, 2000, pp. 765-774.
S. Aladdin "Applied Inter-working in Drive, A Next Generation Multi-Access Approach" Proceedings 9th IEEE International Conf. On Networks, ICON 2001, Bangkok, Thailand Oct. 10, 2001, pp. 8-13.
B. Sarikaya, "Architectural Framework for Global and Localized Mobility Management" Mobile IP Working Group, Internet Draft, IETF, Online Oct. 2002, pp. 1-14.

* cited by examiner

*Primary Examiner*—John Pezzlo
(74) *Attorney, Agent, or Firm*—Squire, Sanders & Dempsey L.L.P.

(57) ABSTRACT

For authentication, authorization and accounting of a user, an AAA server in whose domain the user initialized a session for authentication and authorization of the user with the user's home domain is set as an anchor AAA server. During a handover of the user between different access nodes during the session, session update message to and from the anchor AAA server is used to update the session path. The downstream pointer from the home domain's AAA server to the anchor AAA server is kept unchanged.

47 Claims, 11 Drawing Sheets

AFTER CONTEXT TRANSFER BETWEEN TWO ARs BELONGING TO aAAAL AND ANOTHER AAAL, SEPARATELY

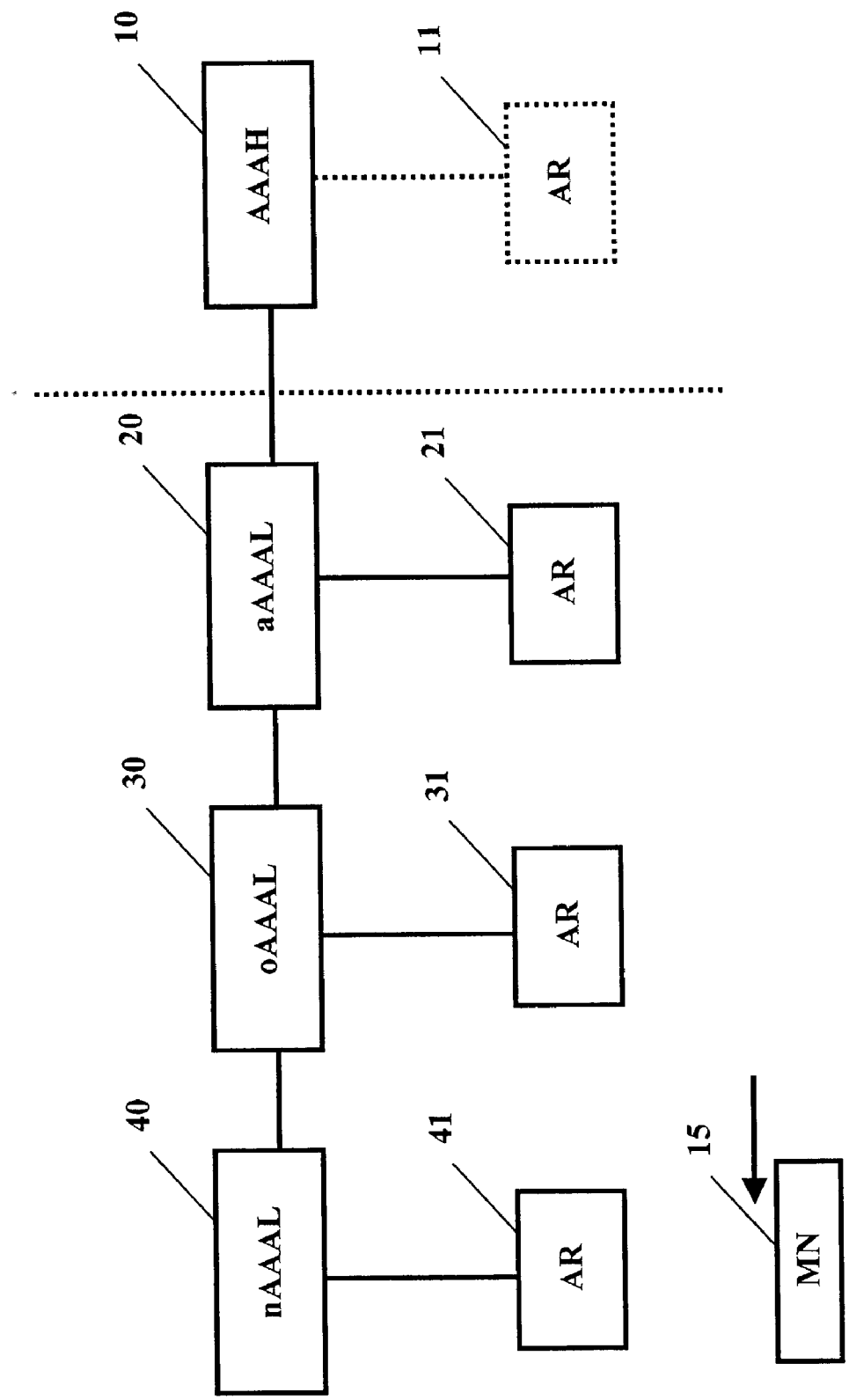
FIG. 1: GENERIC NETWORK STRUCTURE

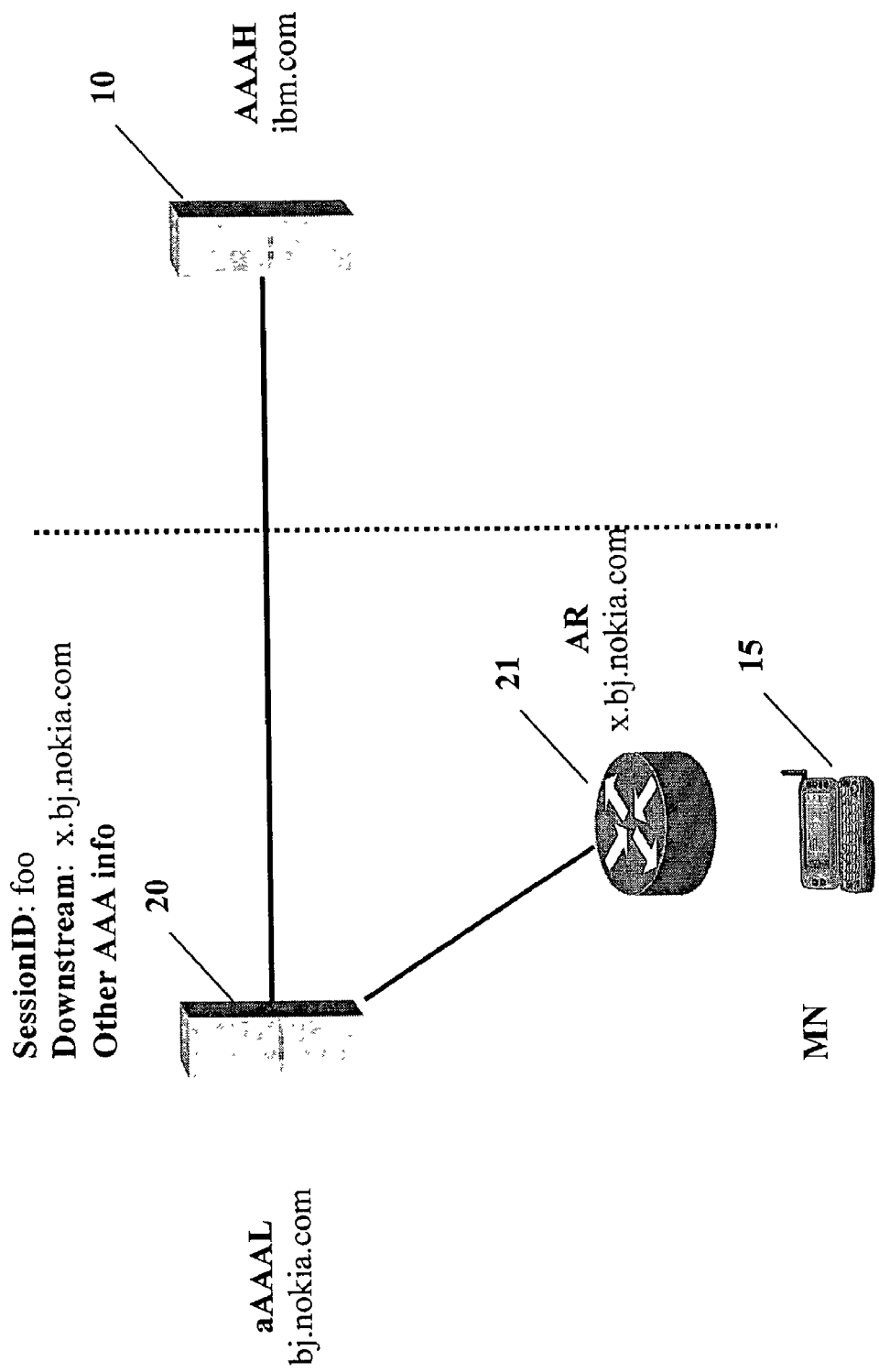
FIG. 2: DIAMETER USER SESSION BEFORE CONTEXT TRANSFER

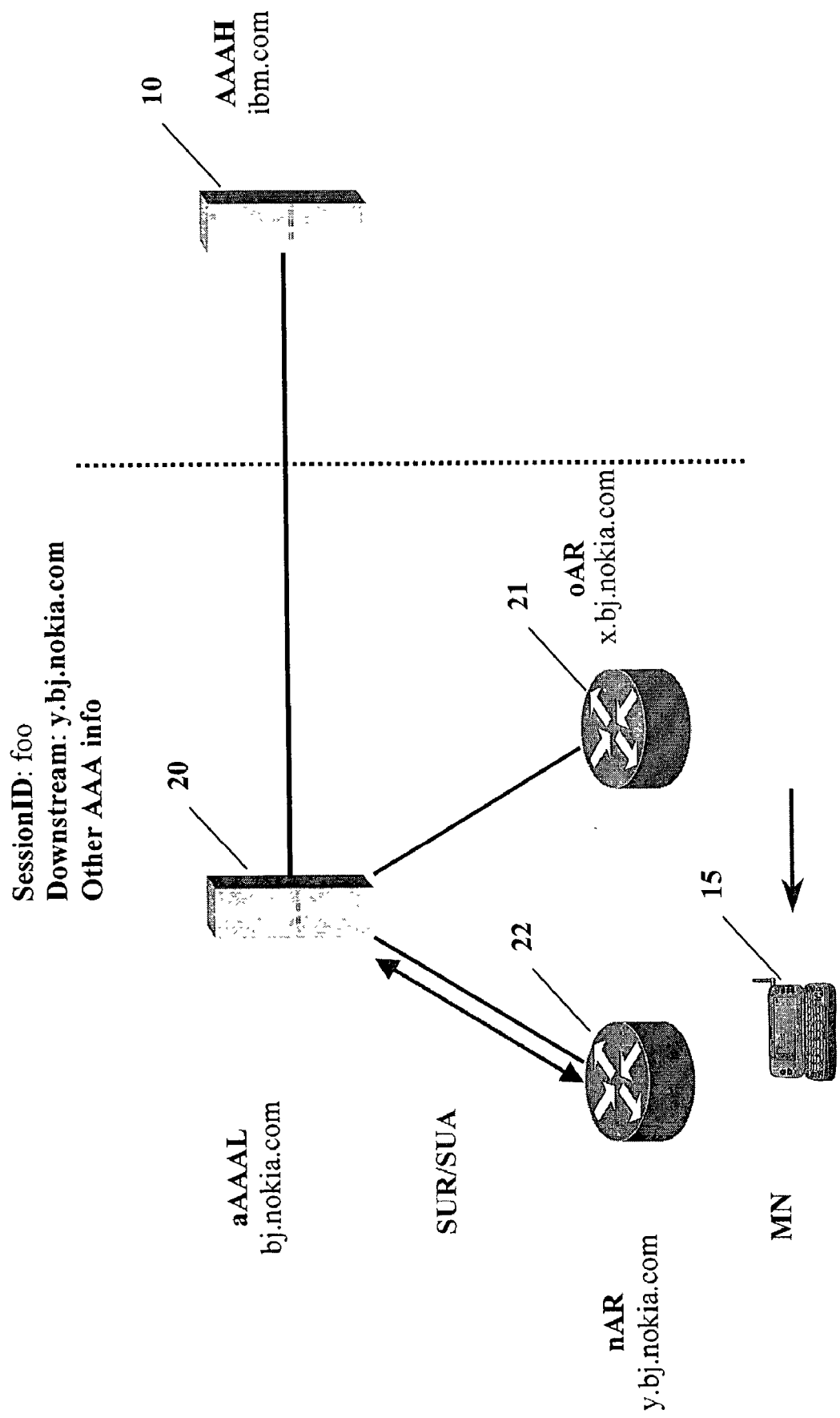
FIG. 3: AFTER CONTEXT TRANSFER INSIDE ONE AAAL

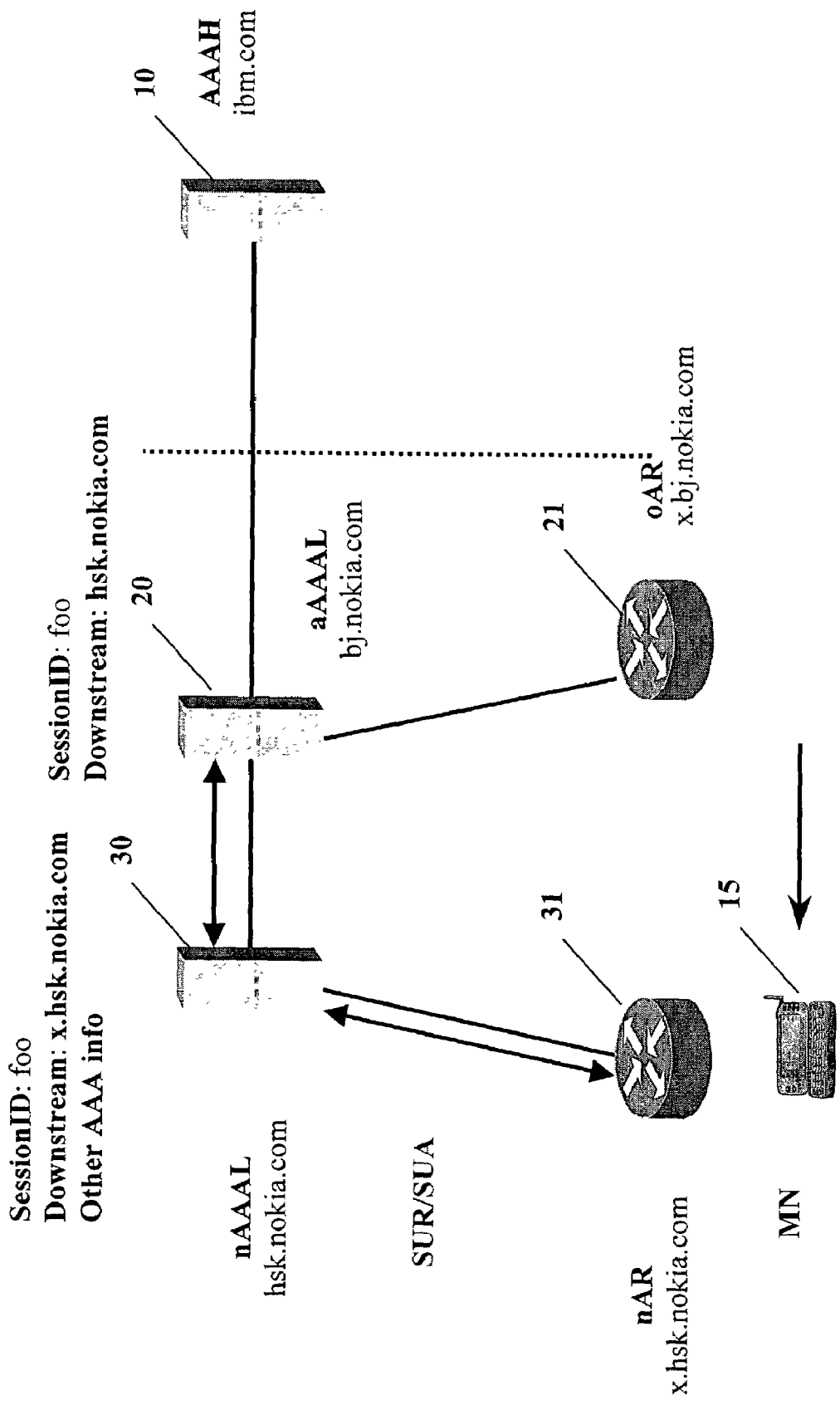
FIG. 4: AFTER CONTEXT TRANSFER BETWEEN TWO ARs BELONGING TO aAAAL AND ANOTHER AAAL SEPARATELY

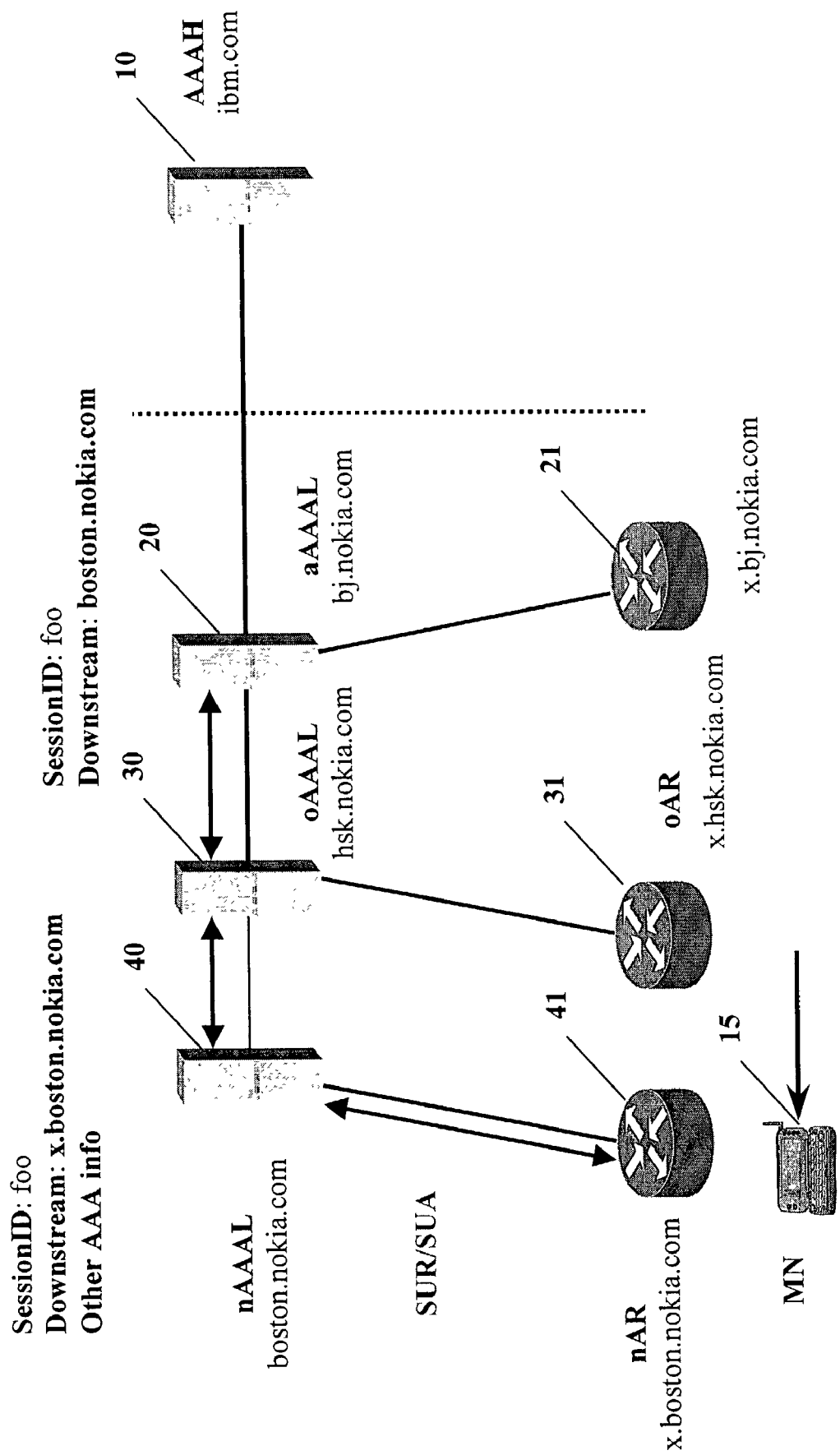
FIG. 5: AFTER CONTEXT TRANSFER BETWEEN TWO ARs BELONGING TO OTHER AAALs

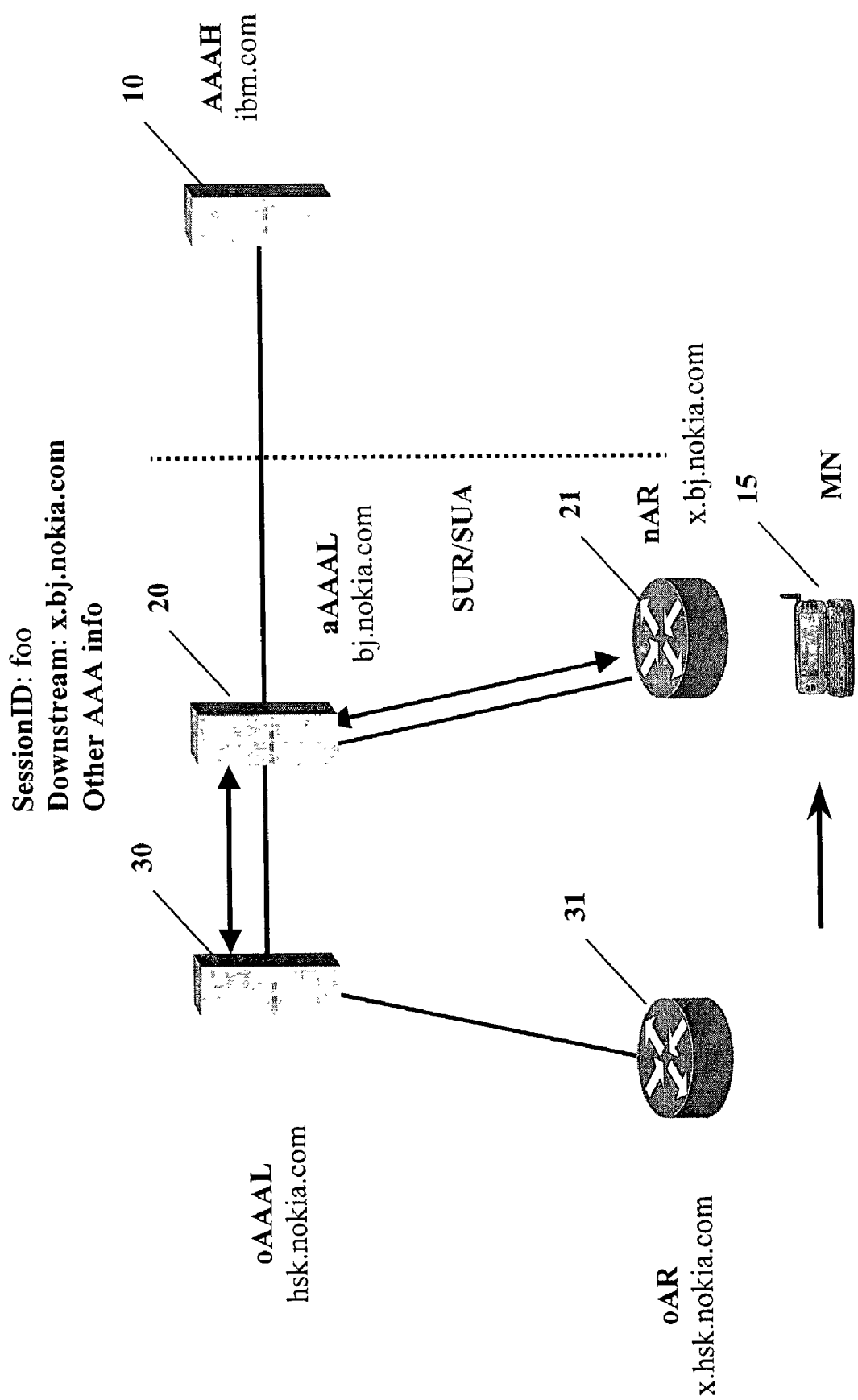
FIG. 6: MN RETURNS TO THE DOMAIN OF aAAAL

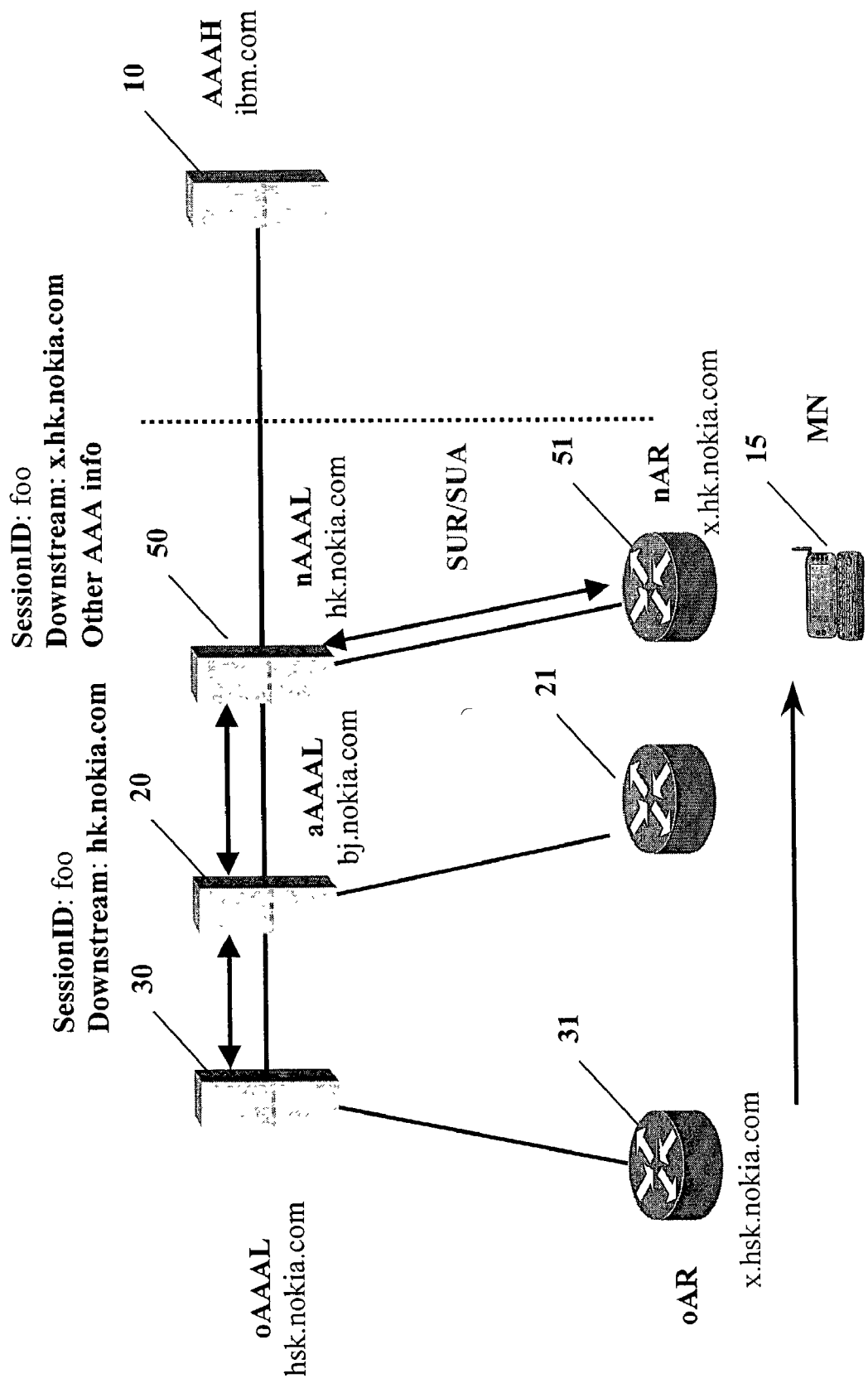
FIG. 7: AFTER CONTEXT TRANSFER BETWEEN TWO ARs BELONGING TO DIFFERENT AAALs, SUR MSG PASS THROUGH aAAAL.

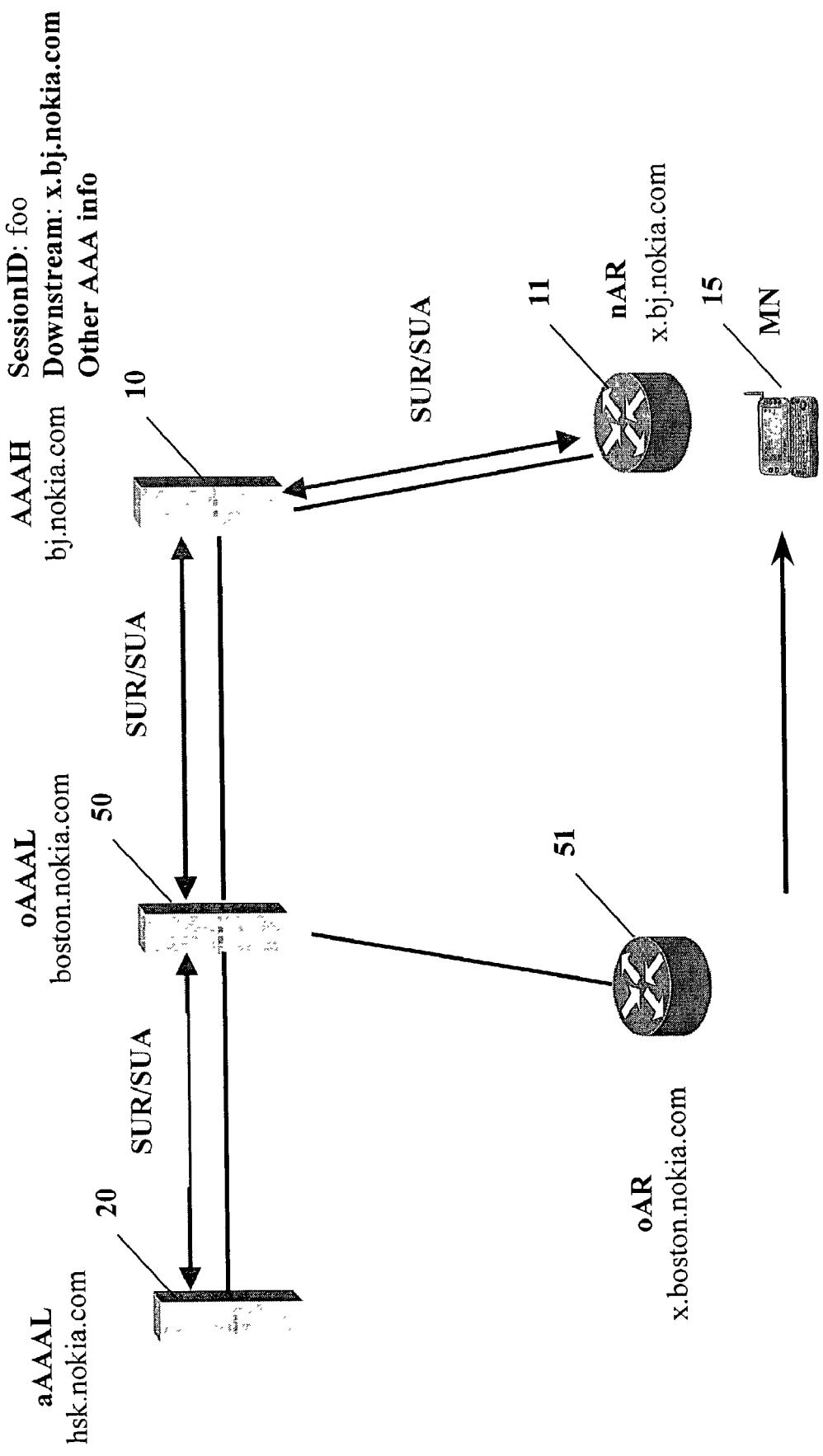
FIG. 8: MN RETURNS TO THE HOME DOMAIN

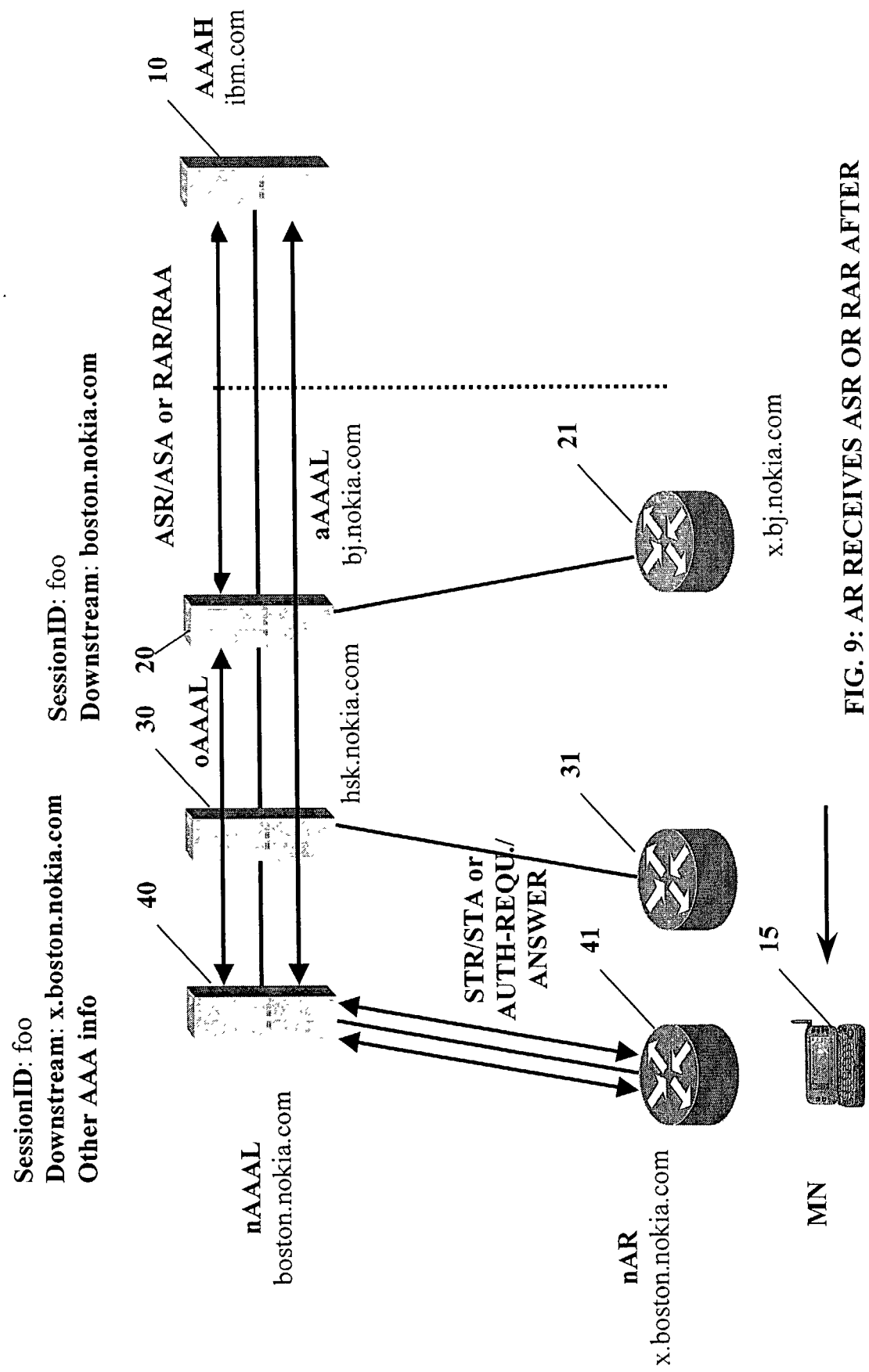
FIG. 9: AR RECEIVES ASR OR RAR AFTER SESSION UPDATE BASED ON FIG. 5

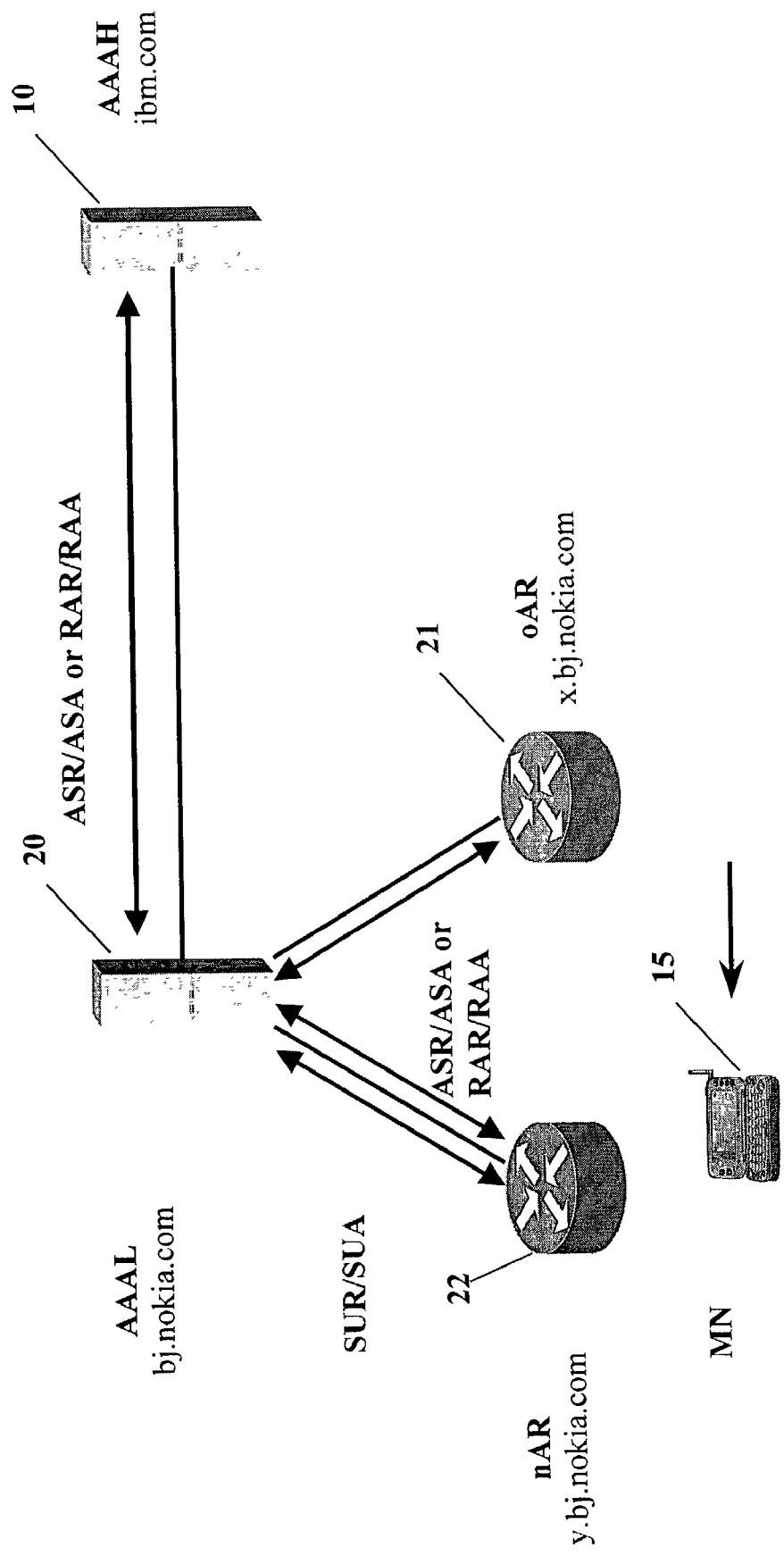
FIG. 10: RACE SCENARIO UNDER THE SAME AAAL

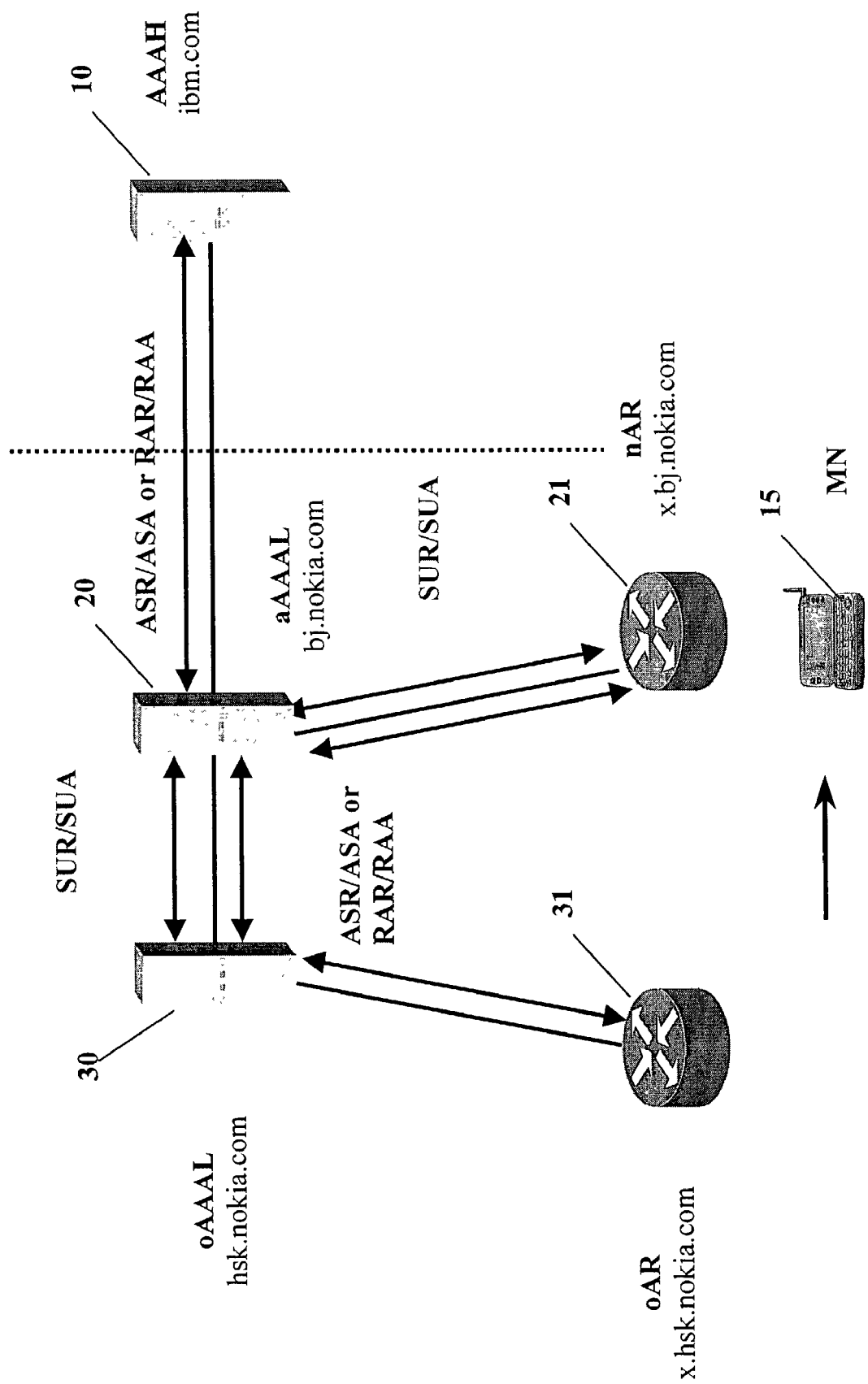
FIG. 11: MN RETURNS TO THE DOMAIN OF aAAAL IN RACE SCENARIO

SESSION UPDATING PROCEDURE FOR AUTHENTICATION, AUTHORIZATION AND ACCOUNTING

TITLE OF THE INVENTION

Session updating procedure for authentiction, authorization and accounting.

BACKGROUND OF THE INVENTION

1. Field of the Invention

The present invention relates to a method and/or a system and/or a network node and/or a method for producing a message for updating a session path for a mobile node in a mobile communication network. The present invention relates in particular to a method and/or a system and/or a network node and/or a method for producing a message for updating a session path of an authentication, authorization and accounting session in a packet based mobile communication network during a handover process.

2. Related Prior Art

In recent years, wireless cellular communication networks are increasingly employed all over the world. In particular, packet based mobile communication networks are developed which uses packet based communication protocols, such as Mobile IP (IP: Internet Protocol) and the like.

As commonly known, one major requirement for using services and resources of wireless access networks is authentication (i.e. verifying the identity of an entity (user)) and authorization (i.e. determining whether a requesting entity (user) will be allowed to access to a resource) of a user, i.e. of the mobile terminal of the user. Wireless access network providers need to authenticate and authorize users, for example, for billing and accounting purposes. An access network usually comprises several access routers (AR) that route IP packets to and from a user's mobile node (MN).

For this purpose, an AAA (AAA: authentication, authorization and accounting) infrastructure is implemented which offers the providers this kind of service. By means of the AAA infrastructure, it is possible, for example, to decide whether to block access of the user to a local network in case of unauthorized users, or not.

The AAA infrastructure is used to authenticate and authorize the user for a so-called session. A session is a related progression of events devoted to a particular activity. The session controls packet filtering and thus a user's access to the network. In AAA infrastructure, a network access identifier (NAI) is used as the user's identity for network access. Sessions are identified with session-IDs, which are bound to the NAI and thus for a specific user. Each session normally has a certain lifetime and state that depends on a result code that the AAA infrastructure provides. For increasing the session lifetime, a re-authentication can be used.

A user's mobile node may change the access router during a single session, for example due to a handover. In such a situation the authentication and authorization of the user has to be ensured. Thus, re-establishment of access to the network from the new access router has to be provided. In "Context Relocation of AAA Parameters in IP Networks", Dan Forsberg et al., draft-forsberg-seamoby-aaa-relocate-00.txt, Seamoby Working Group, internet draft, IETF, 22 Feb. 2002, there is proposed a way to maintain network access authentication and authorization in a handover situation by using context transfers between the access routers. The required network access control state is transferred from the previous access router to the current (new) access router. Thus, the packet filtering rules are rebuild in the new access router for the user without requiring extensive signaling over tie AAA infrastructure.

However, there might exist a requirement that AAA entities, such as AAA hosts or AAA servers are updated in the backbone about the MN's current location. For instance, the AAA server in the MN's home domain, i.e. the home AAA server (AAAH) being located in the administrative domain with which the user maintains an account relationship, may need to be informed if the MN changes the local domain AAA server (AAAL) which is located in the administrative domain providing currently services to a user.

Recently, there is developed a protocol to provide an AAA framework for applications such as network access or IP mobility which is known as Diameter base protocol. The specification of the Diameter base protocol is described, for example, in "Diameter Base Protocol", Pat R. Calhoun et al., draft-ietf-aaa-diameter-12.txt, AAA Working Group, internet draft, IETF, July 2002. Diameter is intended to work both with local AAA and with roaming situations. The Diameter protocol allows peers to exchange a variety of messages and provides a variety of facilities, such as basic services necessary for applications, such as handling of user sessions or accounting (i.e. collecting information on resource usage for the purpose of capacity planning, auditing, billing or cost allocation). The data delivered by the Diameter protocol are in the form of an attribute value pair (AVP). In general, the Diameter protocol comprises a header followed by one or more AVPs. An AVP includes a header and is used to encapsulate protocol-specific data (e.g. routing information) as well as authentication, authorization or accounting information. AVPs are used by the base Diameter protocol to a plurality of features, for example transporting of user authentication information, for the purposes of enabling the Diameter server to authenticate the user, transporting of service specific authorization information, between client and servers, allowing the peers to decide whether a user's access request should be granted, exchanging resource usage information, which may be used for accounting purposes, capacity planning, etc., and relaying, proxying and redirecting of Diameter messages through a server hierarchy.

Assuming that a user intends to use resources of an access network, which is for example not located in the user's home domain, the access router (AR) being contacted by the user's mobile node initiates an authentication and/or authorization request and set up a Diameter session between the AR and the home AAA server (AAAH) which will last until session timeout or being stopped by termination request from the AR. For this purpose, a session path is established in the network. All Diameter packets with the same Session-Id are considered to be part of the same session. When a mobile node, for example, moves during a session, it may receive service from a plurality of ARs. The AAA parameters can be transferred between these ARs along with the handover signaling, for example as described in "Context Relocation of AAA Parameters in IP Networks".

However, there is a problem that in the case that the handover is performed during the session, it may be necessary that the AAAH knows the current location (i.e. the session path) of the MN. For example, the AAAH may desire to re-authenticate the user, or to terminate the session, or to initiate any other request. This is difficult to achieve since the AAA parameters are transferred between ARs, while the session path registered in the AAAH points to the previous AR. By means of the context transfer itself such a dynamic Diameter user session between the new AR and the AAAH can not be maintained, because context transfer only involves the ARs and the MN, but the AAAH is not informed by the context transfer that the MN has moved away from the original (previous) AR.

SUMMARY OF THE INVENTION

Thus, it is desirable to provide an improved mechanism which enables a reliable session path updating for a user session. In particular, such an improved mechanism usable in an AAA infrastructure, for example based on the Diameter base protocol, is desirable.

Therefore, the invention is a method of updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the method comprising the steps of initiating a session by the mobile node via one of the plurality of access nodes in the network, establishing a session path from the home AAA server via the AAA server in whose domain the mobile node initiated the session, setting the AAA server in whose domain the mobile node initiated the session as an anchor AAA server, wherein, when a handover of the mobile node from one previous access node to another current access node is performed during the session, the method further comprises the steps of, producing and transmitting a session update request message from the current access node via the connected AAA server to the anchor AAA server, processing the session update request message in each AAA server receiving the session update request message, and updating the session path on the basis of a processing result of the session update request message.

Furthermore, the invention is a communication network system for updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the system comprising means for initiating a session for the mobile node via one of the plurality of access nodes in the network, a session path from the home AAA server via the AAA server in whose domain the mobile node initiated the session being established and the AAA server in whose domain the mobile node initiated the session being set as an anchor AAA server for the session, wherein, when a handover of the mobile node from one previous access node to another current access node is performed during the session, the system comprises, means for producing a session update request message which is transmitted from the current access node via the connected AAA server to the anchor AAA server, means for processing the session update request message in each AAA server receiving the session update request message, and means for updating the session path on the basis of a processing result of the session update request message.

Moreover, the invention is a communication network node used for an update of a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, wherein a session for the mobile node is initiated via one of the plurality of access nodes in the network, a session path from the home AAA server via the AAA server in whose domain the mobile node initiated the session being established and the AAA server in whose domain the mobile node initiated the session being set as an anchor AAA server for the session, wherein the network node comprises means for producing a session update request message, when a handover of the mobile node from one previous access node to another current access node is performed during the session, which is transmitted from the current access node via the connected AAA server to the anchor AAA server, the session update request message comprises information which are processed in each AAA server receiving the session update request message for updating the session path on the basis of a processing result of the session update request message.

Additionally, the invention is a method of producing a message used for requesting a session update for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, wherein, when a session is initiated by the mobile node via one of the plurality of access nodes in the network and a session path is established from the home AAA server via the AAA server in whose domain the mobile node initiated the session, the AAA server in whose domain the mobile node initiated the session is set as an anchor AAA server, wherein, when a handover of the mobile node from one previous access node to another current access node is performed during the session, the method comprising the steps of inserting in the message destination host data indicating a destination host, inserting in the message anchor AAA server data indicating the anchor AAA server, inserting in the message serving AAA server data indicating the AAA server connected with the current access node, and inserting in the message session update vector data indicating specific AAA servers having received the session update request message.

Furthermore, the invention is a method of producing a message used for answering to a message for requesting a session update according to claim 31, wherein the message for answering is produced in the anchor AAA server and/or in the AAA server connected with the previous access node, the method comprising the steps of copying from the request message the serving AAA server data indicating the AAA server connected with the current access node, and inserting in the message session information data indicating authentication, authorization and accounting information for the mobile node.

Moreover, the invention is a method of updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the method comprising the steps of initiating a session by the mobile node via one of the plurality of access nodes in the network establishing a session path from the home AAA server via the AAA server in whose domain the mobile node initiated the session, wherein, when a handover of the mobile node from one previous access node to another current access node is performed during the session, the method further comprises the steps of producing and transmitting a session update request message from the current access node to the connected AAA server, and updating the session path in the connected AAA server to the current access node on the basis of the session update request message.

Furthermore, the invention is a communication network system for updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the system comprising means for initiating a session for the mobile node via one of the plurality of access nodes in the network, a session path from the home AAA server via the AAA server in whose domain the mobile node initiated the session being established, wherein, when a handover of the mobile node from one previous access node to another current access node is performed during the session, the system comprises means for producing a session update request message which is transmitted from the current access node to the connected AAA server, means for processing the session update request message in the connected AAA server and for updating the session path on the basis of a processing result of the session update request message.

Moreover, the invention is a method of updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the method comprising the steps of initiating a session by the mobile node via one of the plurality of access nodes in the network, establishing a session path from the home AAA server via the AAA server in whose domain the mobile node initiated the session, setting the AAA server in whose domain the mobile node initiated the session as an anchor AAA server, wherein, when a handover of the mobile node from one previous access node to another current access node is performed during the session, the method further comprises the steps of, producing a session update request message, wherein the session update request message is transmitted from the current access node via the connected AAA server to the anchor AAA server, when the current access node and the previous access node are connected with respective different AAA servers, or the session update request message is transmitted from the current access node to the connected AAA server, when the current access node and the previous access node are connected with the same AAA server, processing the session update request message in each AAA server receiving the session update request message, and updating the session path on the basis of a processing result of the session update request message.

Furthermore, the invention is a communication network system for updating a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, the system comprising means for initiating a session for the mobile node via one of the plurality of access nodes in the network, a session path from the home AAA server via the AAA server in whose domain the mobile node initiated the session being established and the AAA server in whose domain the mobile node initiated the session being set as an anchor AAA server for the session, wherein, when a handover of the mobile node from one previous access node to another current access node is performed during the session, the system comprises means for producing a session update request message which is transmitted from the current access node via the connected AAA server to the anchor AAA server, when the current access node and the previous access node are connected with respective different AAA servers, or which is transmitted from the current access node to the connected AAA server, when the current access node and the previous access node are connected with the same AAA server, means for processing the session update request message in each AAA server receiving the session update request message, and means for updating the session path on the basis of a processing result of the session update request message.

Additionally, the invention is a communication network node used for an update of a session path for a mobile node in a packet based mobile communication network, the network comprising a plurality of AAA servers used for handling authentication, authorization and accounting requests for the mobile node in a respective domain, wherein one of the AAA servers is a home AAA server of the mobile node, and a plurality of access nodes covering a respective coverage area via which the mobile node communicates within the network, wherein each of the plurality of access nodes is connected with at least one of the plurality of AAA servers, wherein a session for the mobile node is initiated via one of the plurality of access nodes in the network, a session path from the home AAA server via the AAA server in whose domain the mobile node initiated the session being established and the AAA server in whose domain the mobile node initiated the session being set as an anchor AAA server for the session, wherein the network node comprises, means for producing a session update request message, when a handover of the mobile node from one previous access node to another current access node is performed during the session, which is transmitted from the current access node via the connected AAA server to the anchor AAA server, when the current access node and the previous access node are connected with respective different AAA servers, or which is transmitted from the current access node to the connected AAA server, when the current access node and the previous access node are connected with the same AAA server, the session update request message comprises information which are processed in each AAA server receiving the session update request message for updating the session path on the basis of a processing result of the session update request message.

Advantageous further developments are as set out in respective dependent claims.

Thus, according to further refinements of the invention,
- the processing of the session update request message may be executed in the AAA server connected with the current access node and in the anchor AAA server, and it may be further executed in the AAA server connected with the previous access node;
- each of the plurality of access nodes may be capable of producing the session update request message;
- when the handover is performed, the current access node may be provided with information about the session path pointing to the previous access node, the information identifying the anchor AAA server and/or the AAA server with which the previous access node is connected before the step of producing and transmitting the session update request message, wherein the information about the session path may be provided to the current access node by means of a context transfer of authentication, authorization and accounting information of the mobile node from the previous access node to the current access node, or wherein the information about the session path may be provided to the current access node by the mobile node;
- active session information may be stored in the AAA servers involved in the session of the mobile node, wherein the active session information comprises a session identifier, a downstream node indicating a next access node or AAA server in the session path towards the mobile node, and session timeout value indicating the remaining time period for the active session;
- the session update request message may include destination host data indicating a destination host, anchor AAA server data indicating the anchor AAA server, serving AAA server data indicating the AAA server connected with the current access node, and session update vector data indicating specific AAA servers having received the session update request message;
- a flag may be set in the session update vector data when the session update request message passes the anchor AAA server, and/or a flag in the session update vector data may be set when the session update request message passes the home AAA server;
- a session update answer message from the anchor AAA server and/or from the AAA server connected with the previous access node may be produced and transmitted, whereon the session update answer message may be processed in the AAA server connected with the current access node for updating the session, and the session update answer message may be forwarded to the current access node;
- the session update answer message may comprise session information data indicating authentication, authorization and accounting information for the mobile node;
- the session may be based on a Diameter protocol for authentication, authorization and accounting, wherein session related data are transmitted in form of one or more attribute value pairs.

According to further refinements of the invention, the information about the session path pointing to the previous access node may be provided to the current access by means of a context transfer of authentication, authorization and accounting information of the mobile node from the previous access node to the current access node, or alternatively by the mobile node.

By virtue of the present invention, the following advantages can be achieved:
- When the foreign domain of the MN, i.e. the domain in which the MN initiated the session, is far away from the home domain, signaling transmission time can be saved. Since the new (current) AR does not need to notify the AAAH but another AAAL, either the AR's own AAAL, when the current AR and the previous AR are served by the same AAAL, or the anchor AAA server (aAAAL), when the current AR and the previous AR are served by different AAAL, the request/answer round-trip delay and the amount of signaling messages between domains can be reduced greatly. Furthermore, when the current AR and the previous AR are served by different AAAL, the aAAAL's domain is probably adjacent or at least rather near to the AAAL of the current AR. Thus, signaling distances between AAALs of different domains are rather short. In other words, the invention presents an anchor AAA server which is used for keeping up-to-date information of the mobile node. This makes it possible for home AAA server to reach the mobile node while the AAAH is terminating the sessions, re-authenticating the user or sending some requests to the mobile node which has been moved under another AR or even under different local AAA server.
- Difficulties concerning whether context transfer is performed between ARs inside one AAA server or ARs belonging to different AAA servers are solved. Since the AAAL in whose domain the session is initiated is set as the aAAAL, and the AAAH knows the session path to the aAAAL throughout the session, transmissions between the AAAH and the MN can be smoothly performed even if the MN changes AR coverage area.
- The proposed mechanism and means can easily be applied in Diameter applications since they can be implemented in the Diameter session layer.

The above and still further objects, features and advantages of the invention will become more apparent upon referring to the description and the accompanying drawings.

BRIEF DESCRIPTION OF THE DRAWINGS

FIG. 1 shows a generic communication network structure implementing the proposed mechanism.

FIGS. 2 to 11 show different user session scenarios in the communication network according to FIG. 1.

DESCRIPTION OF PREFERRED EMBODIMENTS

A best mode of carrying out the invention is described in connection with an implementation of the proposed mechanism as an extension of the Diameter base protocol mentioned above. In the figures illustrating the present invention, the same reference signs denote the same or equivalent elements.

FIG. 1 shows a generic mobile communication network structure for illustrating the principles of the proposed mechanism wherein, in order to simplify matters, only those elements are shown which are involved. However, it is known for those skilled in the art that such a mobile communication network comprises several other elements and/or entities which are necessary for its functionality. Moreover, it is also apparent that the described elements are intended merely for illustration purposes. Other types of network elements which perform the same or similar functions as those described below, as well as other types of communication networks which are commonly known for persons skilled in the art are also applicable in connection with the described mechanism.

In FIG. 1, reference sign 10 denotes an authentication, authorization and accounting (AAA) server or agent of the home domain of a mobile node (MN) 15 with which the user maintains an account relationship. Reference sign 11 denotes a access node or access router (AR) connected with the home AAA server (AAAH) 10. When the mobile node is located in its home realm or home domain it is within the coverage area of the AR 11 and communicating via the AR 11.

Reference signs 20, 30, 40 denote local AAA servers (AAAL) which are located in administrative domains being different to the home domain of the MN 15. The AAALs 20, 30, 40 are connected with respective access routers (AR) 21, 31, 41 which form the respective access networks in these foreign domains. When the MN 15 is in the coverage area of a respective one of the ARs 21, 31, 41, the respectively connected AAAL 20, 30, 40 handles authentication, authorization and accounting functions for the MN 15 in this realm. Even though only four ARs and AAA servers connected therewith are shown, the network may comprise more AAA servers and ARs than those shown. Furthermore, more than one AR may be located in one domain, i.e. be connected with one AAA server. Additionally, one AR can be connected with more than one AAA server.

The mobile node MN may be of different type. For example, the MN can comprise a personal computer, a laptop, a mobile phone, a personal data assistant (PDA) or the like. For its communication functionality, the MN includes several means which are known to those skilled in the art. Such means are for example a processor for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy disk, CD-ROM, EEPROM, and the like), user interface means for providing monitor and manipulation possibilities to a user (e.g. a screen, a keyboard, a microphone and headset for communication, and the like), and network interface means for establishing a communication connection under the control of the processor (e.g. and wireless interface means, an antenna, and the like). These means can be integrated within one device (e.g. in case of a mobile telephone) or in several devices forming the mobile node (e.g. in case of a personal computer).

Similarly, an access router comprises several means (not shown) which are required for its communication functionality and which are known to those skilled in the art. Such means are for example a processor for executing instructions and processing data for the communication connection (e.g. transmission forwarding and signaling related data), memory means for storing instructions and data, for serving as a work area of the processor and the like (e.g. ROM, RAM, EEPROM, and the like), input means for inputting data and instructions by software (e.g. floppy disk, CD-ROM, EEPROM, and the like), user interface means for providing monitor and manipulation possibilities to a user (e.g. a screen, a keyboard, and the like), network interface means for establishing a communication connection with mobile nodes under the control of the processor (also by means of further network elements (not shown) such as wireless interface means, an antenna, and the like), interface means for communicating with the network under the control of the processor, and the like. Similarly, the AAA servers may comprise a typical computer structure including storage means, input means, interface means, monitoring means, processor means, and the like.

In the illustrated embodiment, the MN 15, the ARs 11, 21, 31, 41, and the AAA servers 10, 20, 30, 40 support the Diameter base protocol and Diameter applications. However, the present invention is basically also applicable in other AAA infrastructures. The basic concept of the proposed procedure and system will be described below.

The MN 15 initiates a user session in a foreign realm being different to its home realm, for example by the AR 21 in the realm of AAAL 20, in order to access resources or services. Thus, the AR 21 will initiate an authentication and/or authorization request and set up a Diameter session between the AR 21 and the AAAH 10 of the MN 15. This session is identified by a specific session identifier (session Id) ("foo" in the following description).

When the AR with which the MN 15 communicates changes, for example due to a movement of the MN 15, AAA parameters are transferred between the previous (old) AR (oAR) to the current (new) AR (nAR), for example, by means of handover signaling (context transfer), as described above. When the AAA parameters are transferred between two ARs, the Diameter session path (i.e. the way through the network between the AAAH and the current AR) is to be updated in case the AAAH will communicate with the new AR. For this purpose, a so-called anchor AAAL (aAAAL) is set. The aAAAL is the local (foreign) AAA server (AAAL) where the MN has initially established its AAA session with its AAAH before the MN handover.

The following expressions are introduced to describe the network elements involved in the proposed session update procedure. The anchor AAA local server (aAAAL) is the local AAA server which re-directs received AAA messages from the MN's home domain (i.e. from the AAAH 10) to the current MN's location (new AR). A new AAA local server (nAAAL) is the local AAA server of the new AR, which currently provides AAA service to the MN 15. An old AAA local server (oAAAL) is the local AAA server which has previously provided AAA service to the MN 15 before entering the nAAAL's realm. A downstream node is the next hop AAA node which the related AAA message aims to.

It is to be noted that an AAAL may maintain the downstream node for an active session. This means, it has, for example, to maintain information related to the session ID, the downstream node, and the session timeout. Any other user AAA information maintained in an (old) AAAL should be transferred to the new AAAL (nAAAL).

Considering the Diameter base protocol as a basis, two new messages are introduced for implementing the session update procedure. When MN changes its AR, upon the arrival of MN's AAA parameters, the new AR will send a Session-Update-Request (SUR) message, for example through the new AAAL (nAAAL), optionally the old AAAL (oAAAL), to the anchor AAAL (aAAAL), so that the downstream node information maintained in the aAAAL can be updated from the old AAAL (oAAAL) to the new AAAL (nAAAL). Other relevant user AAA information present in AAALs (aAAAL, oAAAL), for example user profile related information, accounting related information including interim interval and last event timestamp, and the like, will be transferred to the NAAAL by Session-Update-Answer message (SUA). The SUA may comprise also further session related information provided by the AAA servers (for example by the aAAAL) which define, for example, packet filtering information. This further session related information can then be used for updating the session, e.g. by introducing new packet filtering rules. This information may be processed by the involved AAAL and/or the nAR. Both the SUR and the SUA will be described in further detail herein below. When the MN 15 changes its AR inside one AAAL, the new AR just sends a Session-Update-Request message to the current AAAL, informing it to update the downstream node information from the old AR to the new AR.

Since the AAAH 10 is not aware of the movement of the MN 15 before the MN 15 re-authenticates, a request from the AAAH 10 (e.g. Abort-Session-Request or Re-Auth-Request, etc.) will always be forwarded from the AAAH 10 to the former realm where the initial authentication request is originated. The request message can always be received by the AAAL that has forwarded the initial authentication request of the session from the initial AR, i.e. the aAAAL. This means that requests from the AAAH 10 will go through the aAAAL. Then aAAAL will modify the request according to the currently stored session path and transmit the modified request to the nAAAL. The NAAAL will forward it to the nAR, i.e. the AR currently communicating with the MN 15. A further detailed description will be given herein below with respect to four general aspects of the session update procedure, which are basic operation, AR operation, AAAL operation and extended Diameter commands and AVPs.

Basic Operation:

First, the basic operation in the system is described in connection with the figures wherein context transfer scenarios, scenarios of communication between AAAH and nAR, and scenarios of communication between AAAH and nAR during context transfer, also called race scenarios, are illustrated.

Context Transfer Scenarios

In FIG. 2, a starting situation for a Diameter user session of the MN 15 is shown. As described above, the MN 15 is located in the coverage area of the AR 21, i.e. in a foreign realm, and wishes to access services provided by AR 21. The AR 21 initiated a Diameter session for authentication and authorization via the connected AAAL 20 with the AAAH 10. Thus, the downstream session path from the AAAH 10 to the current AR 21 for the session having the session ID "foo" points from the AAAH 10 to the AAAL 20 (for example, "bj.nokia.com"), and from the AAAL 20 to the AR 21 (for example, "x.bj.nokia.com"). The AAAL 20 in whose domain the session is initiated is set as the anchor AAA server (aAAAL). Besides the downstream node (pointing to the current AR 21) and the session ID, the aAAAL 20 also stores further AAA information related to the MN 15. The AAAH 10 will forward requests related to the MN 15 (or its current AR) to the aAAAL 20 until a new anchor AAA server has been indicated to the AAAH 10.

In the following, there are described several scenarios when the MN 15 changes the AR coverage area during the session ("foo"), for example, due to a handover of the MN 15 between two ARs.

Now, with reference to FIG. 3, a scenario is described where the context transfer between two ARs is performed which are both connected with the same AAAL. In this situation, when the MN 15 has reached the coverage area of AR 22 and the handover from AR 21 to AR 22 is performed, the oAR (i.e. AR 21) releases the registered session information of the MN 15 after the successful context transfer to the nAR (i.e. AR 22). Thus, the nAR 22 knows from the information included in the context transfer the session path pointing to the oAR, i.e. the AAAL 20 of the previous AR 21. As a further option, the session path related information (i.e., for example, the AAAL of the oAR) may also be transmitted by the MN 15 to the nAR 22 during the handover procedure. Then, the nAR 22 produces and sends a Session-Update-Request (SUR) message to the connected AAAL (i.e. the aAAAL 20) in order to update the downstream node to nAR 22 in the AAAL 20. Hence, the session path from the AAAL 20 is changed to "y.bj.nokia.com". This may be confirmed by sending a corresponding Session-Update-Answer (SUA) message to the nAR 22. The downstream path in the AAAH 10 is not changed.

It is to be noted that the above described procedure is executed irrespective of whether the AAAL of the two ARs is the aAAAL or not. Even though the case of FIG. 3 shows that the AAAL 20 is the aAAAL, the same applies also in a case where the current AAAL is not the aAAAL, which will be described below.

Next, with reference to FIGS. 4 and 5, scenarios are described where the context transfer between two ARs is performed which are both connected with different AAALs.

In FIG. 4, a case is shown when the MN 15 moves from the aAAAL 20 realm to a new realm. This means that the MN 15 moves to the coverage area of AR 31 which is connected with AAAL 30. Similar to the case described in connection with FIG. 3, when the MN 15 has reached the coverage area of AR 31 and the handover from, e.g., AR 21 to AR 31 is performed, the oAR (i.e. AR 21) releases the registered session information of the MN 15 after the successful context transfer to the nAR (i.e. AR 31). Thus, the nAR 31 knows from the information included in the context transfer the session path pointing to the oAR 21, i.e. the AAAL 20 of the previous AR 21, and also the aAAAL (which is in this case also AAAL 20) which is set by the initiation of the session. As a further option, the session path related information (i.e., for example, the oAAAL and the aAAAL) may also be transmitted by the MN 15 to the nAR 31 during the handover procedure. Then, the nAR 31 produces and sends a SUR message with Destination-Host AVP set to aAAAL 20, Anchor-AAA-Server AVP set to aAAAL 20 and Serving-AAA-Server AVP set to nAAAL 30. The request of the command is used to update the downstream node in the aAAAL 20 to the NAAAL (i.e., for example, "hsk.nokia.com). The answer is to transfer the registered user AAA information from aAAAL 20 to the nAAAL 30, which in turn registers this AAA information. Thus, along with the handover of the MN 15, the relevant AAA information in the local AAA server are transferred accordingly from the aAAAL 20 to the NAAAL 30. When the SUR passes the nAAAL 30, the nAAAL 30 updates, besides forwarding the message, its downstream node to the host in a Origin-Host AVP (i.e. to that of the nAR 31, for example, "x.hsk.nokia.com"). When the aAAAL 20 receives the SUR, it updates the downstream node to the value indicated in the Serving-AAA-Server AVP (i.e. "hsk.nokia.com"). Then, the aAAAL 20 produces the SUA message and send it back. In addition, if there is user AAA information maintained in the aAAAL 20, this information is encoded into a Session-Info AVP and included as a part of the SUA message. Once the AAA information is transferred, the aAAAL 20 does not need to maintain it. In the transmission path of the SUA message, when any AAAL detects from the included AVPs that its local host name is equal to the value of Serving-AAA-Server AVP in the SUA message (which means, in turn, that this is the nAAAL 30), it will extract the Session-Info AVP and save the user AAA information (to be extracted from the Session-Info AVP) locally. The SUA is also forwarded to the nAR. Thus, the downstream session path points from the AAAH 10 to the aAAAL 20 ("bj.nokia.com", unchanged) to the nAAAL 30 ("hsk.nokia.com") to the nAR 31 ("x.hsk.nokia.com")

A further case is shown in FIG. 5, in which the MN 15 moves from the coverage area of an AR which is not connected with the aAAAL to the coverage area of another AR which is not connected with the previous AAAL. In detail, the MN 15 moves from the AAAL 30 realm to a new realm of AAAL 40.

This means that the MN 15 moves to the coverage area of AR 41 which is connected with AAAL 40. Similar to the case described in connection with FIG. 3, when the MN 15 has reached the coverage area of AR 41 and the handover from AR 31 to AR 41 is performed, the oAR (i.e. AR 31) releases the registered session information of the MN 15 after the successful context transfer to the nAR (i.e. AR 41). Thus, the nAR 41 knows from the information included in the context transfer the session path pointing (aAAAL 20, oAAAL 30). As a further option, the session path related information (oAAAL, aAAAL) may also be transmitted by the MN 15 to the nAR during the handover procedure. The nAR 41 produces and sends a SUR message with Destination-Host AVP set to oAAAL 30, Anchor-AAA-Server AVP set to aAAAL 20 and Serving-AAA-Server AVP set to nAAAL 40. When the SUR passes the NAAAL 40, the NAAAL 40 updates, besides forwarding the message, its downstream node to the host in a Origin-Host AVP (i.e. to that of the nAR 41, for example, "x.boston.nokia.com"). When the oAAAL 30 receives the SUR, it compares the local host with the value of the Anchor-AAA-Server AVP. Since they are different, the oAAAL 30 replaces the Destination-Host AVP value with that of the Anchor-AAA-Server AVP (aAAAL 20) and send the request out. When the aAAAL 20 receives the SUR message, it updates the downstream node to the value of Serving-AAA-Server AVP (i.e., for example, "boston.nokia.com"). Then, the aAAAL 20 produces the SUA message and send it back. If the user AAA information is maintained in oAAAL 30, the information will be inserted into the SUA message as a Session-Info AVP when the message is forwarded from oAAAL 30 to NAAAL 40. In the transmission path of the SUA message, when any AAAL detects from the included AVPs that its local host name is equal to the value of Serving-AAA-Server AVP in the SUA message (which means, in turn, that this is the NAAAL 40), it will extract the Session-Info AVP and save the user AAA information (to be extracted from the Session-Info AVP) locally. The SUA is also forwarded to the nAR. Thus, the downstream session path points from the AAAH 10 to the aAAAL 20 ("bj.nokia.com", unchanged) to the NAAAL 40 ("boston.nokia.com") to the nAR 41 ("x.boston.nokia.com").

Another scenario is described with reference to FIG. 6. In this case, the MN 15 returns to the realm of the AAAL 20 in whose domain the session has been initiated (i.e. to the aAAAL 20). In detail, the MN 15 moves from the AAAL 30 realm to the realm of AAAL 20. This means that the MN 15 moves to the coverage area of, for example, AR 21 which is connected with AAAL 20. Similar to the case described in connection with FIG. 3, when the MN 15 has reached the coverage area of AR 21 and the handover from AR 31 to AR 21 is performed, the oAR (i.e. AR 31) releases the registered session information of the MN 15 after the successful context transfer to the nAR (i.e. AR 21). Thus, the nAR knows from the information included in the context transfer the session path pointing (aAAAL, oAAAL). As a further option, the session path related information (oAAAL, aAAAL) may also be transmitted by the MN 15 to the nAR during the handover procedure. The nAR 21 produces and sends a SUR message with Destination-Host AVP set to oAAAL 30, Anchor-AAA-Server AVP set to aAAAL 20 and Serving-AAA-Server AVP set to nAAAL 20. When the SUR passes through nAAAL 20, the nAAAL 20 will update, besides forwarding the message, its downstream node to the Origin-Host (i.e., for example, to "x.bj.nokia.com"). In this case, the AAAL 20 discovers that it is the original aAAAL. For this reason, a Session-Update-Vector in the SUR message is added with a Passed-Anchor-AAAL flag which is set to one. This flag informs the oAAAL 30 that the message has passed aAAAL 20. Then, the SUR message is forwarded. On receipt of the SUR message, since the Passed-Anchor-AAAL flag is set to be one in the message, the oAAAL 30 encodes the maintained user AAA information into a Session-Info AVP and includes the same as a part of a SUA message to be sent back. In the path of the SUA message, if any AAAL detects that its local host name is equal to the value indicated in the Serving-AAA-Server AVP in the message (i.e. it is the NAAAL), it extracts the Session-Info AVP and save the user AAA information locally. The SUA is also forwarded to the nAR. Thus, the downstream session path points from the AAAH 10 to the aAAAL 20 ("bj.nokia.com", unchanged, which is now also the NAAAL) to the nAR 21 ("x.bj.nokia.com").

With reference to FIG. 7, a scenario is described in which the MN 15 from one AAAL to another AAAL, both not being the initial AAAL (aAAAL), wherein the aAAAL is placed between the two other AAALs. In detail, the MN 15 moves from the AAAL 30 realm to a new realm of AAAL 50. This means that the MN 15 moves to the coverage area of AR 51 which is connected with AAAL 50. However, in the illustrated case, the aAAAL 20 is placed between AAAL 30 and AAAL 50. Since none of the involved ARs (AR 31 or AR 51) are aware that the route to the oAAAL 30 passes the aAAAL 20, the Destination-Host of a SUR message still points to oAAAL 30. Thus, a following handling for the SUR message is executed. Similar to the case described in connection with FIG. 3, when the MN 15 has reached the coverage area of AR 51 and the handover from AR 31 to AR 51 is performed, the oAR (i.e. AR 31) releases the registered session information of the MN 15 after the successful context transfer to the nAR (i.e. AR 51). Thus, the nAR knows from the information included in the context transfer the session path pointing (aAAAL, oAAAL). As a further option, the session path related information (oAAAL, aAAAL) may also be transmitted by the MN 15 to the nAR during the handover procedure. Then, the nAR 51 produces and sends the SUR message with Destination-Host AVP set to oAAAL 30, Anchor-AAA-Server AVP set to aAAAL 20 and Serving-AAA-Server AVP set to NAAAL 50 (i.e., for example, "hk.nokia.com"). When the SUR message passes through the nAAAL 50, the NAAAL 50 will update, besides forwarding the message, its downstream node to the host indicated in the Origin-Host AVP (i.e., for example, to "x.hk.nokia.com"). When the SUR message passes through the aAAAL 20, the aAAAL 20 discovers that its local host is not equal to the value indicated in the Serving-AAA-Server value. Hence the aAAAL 20 updates its downstream node to the Serving-AAA-Server ("hk.nokia.com"). Furthermore, a Session-Update-Vector is added with a Passed-Anchor-AAAL flag which is set to one. Then, the SUR message is forwarded. On receipt of SUR message from the aAAAL 20, since the Passed-Anchor-AAAL flag is set to one in the message, the oAAAL 30 encodes the maintained user AAA information into a Session-Info AVP and includes it as a part of a SUA message which is sent back. In the path of the SUA, if any of the AAAL detects that its local host name is equal to the value of the Serving-AAA-Server AVP in the message (i.e. it is nAAAL 50), it extracts the Session-Info AVP and save the user AAA information locally. The SUA is also forwarded to the nAR. Thus, the downstream session path points from the AAAH 10 to the aAAAL 20 ("bj.nokia.com", unchanged) to the NAAAL 50 ("hk.nokia.com") to the nAR 51 ("x.hk.nokia.com").

Next, with reference to FIG. 8, a case is described in which the MN 15 returns to its home domain. In detail, the MN 15 moves, for example, from the AAAL 50 realm to the home realm of AAAH 10. This means that the MN 15 moves to the coverage area of AR 11 which is connected with AAAH 10. Similar to the case described in connection with FIG. 3, when the MN 15 has reached the coverage area of AR 11 and the handover from AR 51 to AR 11 is performed, the oAR (i.e. AR 51) releases the registered session information of the MN 15 after the successful context transfer to the nAR (i.e. AR 11). Thus, the nAR knows from the information included in the context transfer the session path pointing (aAAAL, oAAAL). As a further option, the session path related information (oAAAL, aAAAL) may also be transmitted by the MN 15 to the nAR during the handover procedure. Then, the nAR 11 will send a SUR message with Destination-Host AVP set to the oAAAL 50, Anchor-AAA-Server AVP set to aAAAL 20 and Serving-AAA-Server AVP set to nAAAL 10 (i.e. AAAH). When the SUR message passes through the nAAAL 10, which is the AAAH, the AAAH 10 adds a Session-Update-Vector AVP with a Passed AAAH flag which is set to one, in order to inform the aAAAL 20 that the SUR message has passed the AAAH 10. When the oAAAL 50 receives the SUR message, it compares the local host with the value of Anchor-AAA-Server AVP. Since they are different, the oAAAL 50 replaces the Destination-Host AVP value with that of the Anchor-AAA-Server AVP in the SUR message and send the request out. When aAAAL 20 receives the SUR message, it recognizes that the Passed-AAAH flag is set to one. Since the new AAA server is the home AAA server of the MN 15, it can be application specific whether to include and transfer the maintained user AAA information as Session-Info-AVP in the SUA message or not. After the SUA message is produced (in accordance with the application specification concerning the AAA information), the SUA is sent back, and the user relevant AAA information of the session are released in the aAAAL 20. Similarly, if user AAA information is maintained in oAAAL 50, it may be also application specific whether to transfer the maintained user AAA information to the NAAAL (i.e. the AAAH 10) or not. Also, this information in the oAAAL 50 can be released after forwarding the SUA message. The SUA is also forwarded to the nAR.

Scenarios of Communication Between AAAH and nAR

Next, there are described scenarios in which the AR will re-authenticate or terminate the session caused by a Re-Authentication-Request (RAR) or Abort-Session-Request (ASR) from the AAAH separately.

The first case is when the MN is still in the realm of the aAAAL (as shown in FIGS. 2 and 3). Then, the request (RAR or ASR) is forwarded according to the downstream node registered in the aAAAL and thus sent to the current AR. In response to the request, either a re-authentication or a session abort is then performed.

The second case is when the MN is located in the realm of an AAAL different to the aAAAL. As an example, in FIG. 9, a situation is shown which is based on the scenario illustrated in FIG. 5. When the AAAL 20 receives the RAR or ASR from the home domain (AAAH 10) of the MN 15 or when the nAAAL 40 receives from the RAR or ASR from aAAAL 20 (according to the downstream node in the aAAAL), the respective AAAL continues to forward the message after replacing the value of Destination-Host AVP with its saved downstream node of this session ("foo"). The request is received by the nAR 41 and processed according to the Diameter protocol. In response to the RAR or ASR, a corresponding Re-Authentication-Answer (RAA) or Abort-Session-Answer (ASA) is sent back. The user AAA information in the aAAAL 20 can be released after the RAA is forwarded therefrom or the ASA with a DIAMETER_SUCCESS Result-Code (according to Diameter base protocol) is forwarded.

In a case where the nAR (e.g. AR 41 in FIG. 9) re-initiates an authentication request (auth-requ.) through a NAAAL 40, this NAAAL 40 becomes the (new) anchor AAA server (aAAAL) for this type of extended session. The downstream node in the old aAAAL 20 will then be released, for example, upon expiry of the session timeout.

In a case where a session termination is initiated by current AR 40, the AR 40 forwards a Session-Termination-Request (STR) to the AAAH 10 as defined in the Diameter base protocol. The user AAA information in the aAAAL 20, if it is not the current (serving) AAAL, will be released by session timeout. It is to be noted that the re-authentication or STR should be delivered as defined in the Diameter base protocol.

If the AAAH 10 receives a message from a NAAAL being different to the aAAAL 20 registered in the session path of the AAAH 10, for example in the case described above when the AAAL 40 becomes the new aAAAL, the AAAH 10 updates the pointer of the session path from the (previous) aAAAL 20 to the new aAAAL 40.

Race Scenarios

In some cases, it is possible that a communication between the AAAH and current AR is to be performed during context transfer. This case is described, for example, with reference to FIG. 10, which is based on the scenario described in connection with FIG. 3. In this case, the oAR 21 receives a request (e.g. a RAR or ASR) from AAAL 20 (possibly originally from the AAAH 10) which is related to a session that has moved from the oAR 21 to the nAR 22. This may be the case when the SUR message from the nAR 22 has not yet been completely processed. The oAR 21 answers then with a Result-Code which is set, for example, to DIAMETER_UNKNOWN_SESSION_ID according to the Diameter protocol. Upon receipt of such an answer, the AAAL (current AAAL, when both the new and the old AR are connected with the same AAAL, or oAAAL, when the new and the old AR are connected with different AAALs)

will wait for the SUR message with the matching session-Id AVP. Until then, the AAAL (current AAAL or oAAAL) either forwards the corresponding answer to the upstream AAAL or re-send the request (retrieved from the pending queue) to the new downstream AR (nAR) or nAAAL.

AR OPERATION

In the following, the operation of the AR in the session update procedure is described. It is assumed that each AR knows its local AAA server, for example, by a corresponding stored address information or the like. During a context transfer, e.g. due to a handover, the values of the oAAAL and aAAAL are to be transferred from the oAR to nAR. After a successful context transfer, the oAR releases the session information. The nAR sends a Session-Update-Request (SUR) to the oAAAL with Destination-Host AVP set to oAAAL. If oAAAL is not equal to any of the nAR's local AAA servers (for example based on a comparison result between the oAAAL identity and the saved connected AAAL identity/identities), it is also included an Anchor-AAA-Server AVP in the SUR message with the value of the aAAAL transferred from the oAR during the context transfer and a Serving-AAA-Server AVP with the value of the nAAAL.

AAAL Operation

Next, the operation of the AAAL during the session update procedure is described. First, an example of a pseudo code used by the AAAL for handling a SUR message is given below. The pseudo code itself is represented in cursive, while explanations are introduced in normal letters enclosed by /* . . . */, where appropriate:

```
/* AAAL handles SUR from another AAAL or AR */
On_Receipt_SUR(AAAMessage *request)
{
    /* SessionId = foo */
    if(local host == Destination-Host) {
        switch (Anchor-AAA-Server AVP) {
        case. there is no Anchor-AAA-Server AVP {
        /*see FIG. 3 & it is the AAAL: context transfer is inside one
        AAAL */
            Update its pointer to Origin-Host:
            ComposeMessage(request, answer, null):
            AAASendMessage(answer);
        }
        case: local host != Anchor-AAA-Server {
            if(Passed-Anchor-AAAL flag == 1) {
            /* FIGS. 6, 7 & it is oAAAL: MN has returned to its
            aAAAL or msg pass through aAAAL */
                Session-Info = user AAA info;
                ComposeMessage(request, answer, Session-Info);
                AAASendMessage(answer);
            } else {
                /*FIG. 5 & it is oAAAL: context transfer is between
                two AAALs */
                request.Destination-Host = Anchor-AAA-Server;
                AAASendMessage(request);
            }
        }
        case: local host == Anchor-AAA-Server {
            /* FIGS. 4, 5 & it is aAAAL: context transfer is between
            two AAALs */
            Update its pointer to Serving-AAA-Server;
            if(user AAA info is maintained locally)
                Session-Info = user AAA info;
            ComposeMessage(request, answer, Session-Info);
            AAASendMessage(answer);
        }
    }
    else if (local host == Serving-AAA-Server) {/* it is nAAAL */
        Update its pointer to Origin-Host;
        if(local host == Anchor-AAA-Server) /*FIG. 5 & it is
        aAAAL */
            Add Session-Update-Vector to the request with Passed-
        Anchor-AAAL flag to one,
            if(local host == Anchor-AAA-Server) /* FIG. 7 & it is AAAH */
                Add Session-Update-Vector to the request with Passed-
        AAAH flag to one;
            Forward message (request);
    }
    else if(local host == Anchor-AAA-Server) {/*FIG. 6 &
    it is aAAAL */
        Update its pointer to Serving-AAA-Server;
        Insert Passed-Anchor-Flag to request;
        Forward message (request);
    }
}
```

In detail, when the AAAL receives a SUR in which the Destination-Host is equal to local host, first it is checked by the AAAL whether the SUR includes an Anchor-AAA-Server AVP. If none exists, this means that the context transfer is performed inside the AAAL realm. Then, the AAAL only need to update its downstream node from the oAR to the nAR. Otherwise, the local host is compared by the AAAL with the value of Anchor-AAA-Server of the SUR message. If they are different, this indicates that the AAAL is not the aAAAL. Then, the further proceeding on forwarding the SUR message is to be decided by checking the Passed-Anchor-AAAL flag of the Session-Update-Vector AVP. If this flag is set to one which means that the SUR message has passed the aAAAL, the AAAL sends back a Session-Update-Answer message with the Session-Info AVP including the maintained AAA information. Otherwise, if this flag is not set, the Destination-Host value is replaced with that of the Anchor-AAA-Server. Then, the AAAL continues to send the SUR message. If the local host matches to the value of the Anchor-AAA-Server AVP, besides updating the downstream node to the Serving-AAA-Server indicated in the SUR, the AAAL (i.e. the aAAAL) produces and sends back the SUA message, which includes Session-Info AVP if user AAA information for the session is still maintained in the AAAL.

In case the SUR message passes through an AAAL whose local host is not equal to the Destination-Host AVP, the AAAL compares the local host with the Serving-AAA-Server AVP and the Anchor-AAA-Server AVP. If the local host matches to the Serving-AAA-Server, the AAAL updates its downstream node to the value of the Origin-Host. If the local host matches to the Anchor-AAA-Server, a Session-Update-Vector with a Passed-Anchor-AAAL flag being set to one is to bee added. In addition, if the Serving-AAA-Server does not match, the AAAL will update its downstream node to the value of Serving-AAA-Server.

Furthermore, an example of a pseudo code used by the AAAL for handling a SUA message is given below. The pseudo code itself is represented in cursive, while explanations are introduced in normal letters enclosed by /* . . . */, where appropriate:

```
/* AAAL handles SUA from another AAAL */
On_Receipt_SUA(AAAMessage *answer)
{
    /* SessionId = foo */
    if it is the destination of the answer {/*FIG. 4 & it is oAAAL */
        Get old SUR request from AR corresponding to the answer;
        ComposeMessage(request, newAnswer, answer);
```

-continued

```
        If(user AAA info is maintained locally)
            newAnswer.Session-Info = user AAA info;
            AAASendMessage(newAnswer);
        }
        else if(local host == Serving-AAA-Server) {
            extract Session-Info AVP;
            save user AAA info locally;
        }
}
```

In detail, when the AAAL receives a SUA message and also maintains the user AAA information of the session, the generated SUA message has to include a session-Info AVP comprising, in an encoded form, the user AAA information. Then this (new) SUA message is sent back to (current) AR. When the SUA message passes through the NAAAL, the user AAA information are to be extracted from the message and saved locally.

As already described with reference to FIG. 9, when the AAAL receives a RAR or ASR from the home domain of the MN or from the aAAAL, the AAAL has to continue to forward the message after replacing the value of the Destination-Host AVP with its saved downstream node of this session. Upon the receipt of the answer for the request (RAR, ASR), it will release the maintained AAA information after the answer is sent out.

When the session timeout is reached, the AAAL releases the downstream node (if exists).

AAAL Operation in the Race Scenario

In the following, the race scenario discussed with reference to FIG. 10 is described from the point of view of the AAAL. In this connection, it is also referred to FIG. 11, which shows a case where the MN returns to the domain of the aAAAL in a race scenario which is based on the situation illustrated in FIG. 6.

If the AAAL receives an answer with the Result-Code AVP set to DIAMETER_UNKNOWN_SESSION_ID from a downstream AR (oAR) or AAAL, as described above, the AAAL will wait for the SUR message with the matching Session-Id AVP for a certain period of time, meanwhile holding the answer. After the matching SUR message has been received and neither of the flags (Passed-AAAH flag or Passed-Anchor-AAAL flag) of the Session-Update-Vector AVP is set, the AAAL will re-send the request to the new downstream AR (nAR) or AAAL and release the answer. Hence, according to FIG. 10, the AAAL waits for the SUR after receipt of ASA/RAA from the oAR. When the SUR message is received from the nAR, the AAAL 20 re-sends ASR/RAR to nAR. On the other hand, according to FIG. 11, the oAAAL waits for the SUR after the receipt of the ASA/RAA from the oAR. When the SUR (comprising a Passed-Anchor-AAAL set to one) is received from the aAAAL, the oAAAL forwards the ASA/RAA to the aAAAL. The aAAAL re-sends the ASR/RAR to nAR after this ASA/RAA is received from the oAAAL.

Extended Diameter Commands and AVPs

Now, extended commands for the Diameter protocol as well as used AVPs related thereto are described which are implemented for the realization of the session update procedure.

The Session-Update-Request (SUR) message is described first. The SUR message is indicated by the Command-Code set, for example, to TBD (which means "to be determined", i.e. specification dependent) and the Command flags' "R" bit set (for indicating a request to the system), according to the Diameter protocol. The SUR is sent by the access node (AR) or the Diameter Server (AAAL) to inform the relevant Diameter server that an authenticated and/or authorized session is being updated.

As indicated above, messages according to the Diameter protocol comprises AVPs. The message format of the SUR may be, for example, as follows:

<SUR> ::=< Diameter Header: TBD, REQ, PXY >
      < Session-Id >
      { Origin-Host }
      { Origin-Realm }
      { Destination-Host }
      { Destination-Realm }
      { Auth-Application-Id }
      [ User-Name ]
      [ Anchor-AAA-Server ]
      [ Serving-AAA-Server ]
      [ Session-Update-Vector ]
      [ Class ]
      [ Origin-State-Id ]
      [ AVP ]
      [ Proxy-Info ]
      [ Route-Record ]

As described above, the most relevant parts of the SUR are the Destination-Host AVP, the Anchor-AAA-Server AVP, the Serving-AAA-Server AVP and the Session-Update-Vector.

On the other hand, the Session-Update-Answer (SUA) message is indicated by the Command Code set to TBD and the message flags' "R" bit clear. The SUA is sent by the Diameter server to acknowledge the notification that the session has been updated. The Result-Code AVP must be present wherein an indication that an error occurred while servicing the SUR may be optionally included.

The message format of the SUA may be, for example, as follows:

<SUA> ::= < Diameter Header: TBD, PXY >
      <Session-Id >
      { Result-Code }
      { Origin-Host }
      { Origin-Realm }
      [ User-Name ]
      [ Session Info ]
      [ Serving-AAA-Server ]
      [ Class ]
      [ Error-Message ]
      [ Error-Reporting-Host ]
      [ Failed-AVP ]
      [ Origin-State-Id ]
      [ Redirect-Host ]
      [ Redirect-Host-Usage ]
      [ Redirect-Max-Cache-Time ]
      [ AVP ]
      [ Proxy-Info ]

The SUA thus comprises besides the Serving-AAA-Server AVP the Session-Info AVP in which the user related AAA information can be included by the AAAL. Furthermore, the SUA can also be used to transmit further session related information from the AAAL (e.g. the aAAAL, AAAH) to the nAR. This information can be related, for example, to packet filtering. By means of this, it is possible to update the current session, for example, with regard to the used packet filtering. The further session related information can be included either in a separate AVP or in connection with the Session-Info AVP. The AAALs and the nAR receiving the SUA comprising the further session related information may extract it and process it accordingly.

Next, the new AVPs which are to be introduced in the Diameter protocol are described in further detail. In the following table 1, these new AVPs are illustrated according to the Diameter protocol.

TABLE 1

| Attribute Name | AVP Code | Data Type | AVP Flag rules | | | | |
|---|---|---|---|---|---|---|---|
| | | | MUST | MAY | SHLD NOT | MUST NOT | MAY Encr |
| Anchor-AAA-Server | TBD | DiamIdent | M | P | | V | Y |
| Serving-AAA-Server | TBD | DiamIdent | M | P | | V | Y |
| Session-Info | TBD | Grouped | M | P | | V | Y |
| Session-Update-Vector | TBD | Unsigned32 | M | P | | V | Y |

The Anchor-AAA-Server AVP (AVP Code TBD) is of type DiameterIdentity and contains the identity of the anchor AAA server (i.e. the aAAAL) in the foreign network. The Serving-AAA-Server AVP (AVP Code TBD) is of type DiameterIdentity and contains the identity of the serving AAA server (i.e. nAAAL) in the foreign network. The Session-Update-Vector AVP (AVP Code TBD) is of type Unsigned32 and is added with flag values (e.g. Passed-AAAH flag or Passed-Anchor-AAAL flag) set to one by the aAAAL or the AAAH. Corresponding flag values may be defined, for example, as "1" for the Passed-Anchor-AAAL flag and 2 for the Passed-AAAH flag. The Session-Info AVP (AVP Code TBD) is of type "Grouped" and contains the user AAA information (except the Session-Id) which are maintained in the AAAL and sent by means of the SUA. The possible values of this Session-Info AVP are TBD. The corresponding AVP format according to Diameter protocol may have the following form:

<Session-Info> ::= < AVP Header: TBD >
    1* {AVP }

As described above, there is disclosed a procedure in which, for authentication, authorization and accounting of a user, an AAA server in whose domain the user initialized a session for authentication and authorization of the user with the user's home domain is set as an anchor AAA server. During a handover of the user between different access nodes during the session, session update message to and from the anchor AAA server is used to update the session path. The downstream pointer from the home domain's AAA server to the anchor AAA server is kept unchanged.

It should be understood that the above description and accompanying figures are merely intended to illustrate the present invention by way of example only. The described embodiments of the present invention may thus vary within the scope of the attached claims.

The invention claimed is:

1. A method of updating a session path for a mobile node in a packet based mobile communication network, the method comprising:

providing a plurality of authentication, authorization and accounting (AAA) servers used for handling authentication, authorization and accounting requests for the mobile node in a respective domain, wherein one of the AAA servers is a home AAA server of the mobile node, and providing a plurality of access nodes covering a respective coverage area via which the mobile node communicates within the network, wherein each of the plurality of access nodes is connected with at least one of the plurality of AAA servers, initiating a session by the mobile node via one of the plurality of access nodes in the network;

establishing a session path from a home authentication, authorization, and accounting (AAA) server via a AAA server in whose domain the mobile node initiated the session;

setting the AAA server in whose domain the mobile node initiated the session as an anchor AAA server;

wherein, when a handover of the mobile node from one previous access node to another current access node is performed during the session, producing and transmitting a session update request message from the current access node via the connected AAA server to the anchor AAA server;

processing the session update request message in each AAA server receiving the session update request message; and updating the session path on the basis of a processing result of the session update request message.

2. The method according to claim 1, wherein the processing step is executed in the AAA server connected with the current access node and in the anchor AAA server.

3. The method according to claim 2, wherein the processing step is executed in the AAA server connected with the previous access node.

4. The method according to claim 1, wherein, when the handover is performed, the method further comprises:

providing the current access node with information about the session path pointing to the previous access node, the information identifying the anchor AAA server and/or the AAA server with which the previous access node is connected before the step of producing and transmitting the session update request message.

5. The method according to claim 4, wherein the information about the session path is provided to the current access node by a context transfer of authentication, authorization and accounting information of the mobile node from the previous access node to the current access node.

6. The method according to claim 4, wherein the information about the session path is provided to the current access node by the mobile node.

7. The method according to claim 1, further comprising storing active session information in the AAA servers involved in the session of the mobile node, wherein the active session information comprises a session identifier, a downstream node indicating a next access node or AAA server in the session path towards the mobile node, and session timeout value indicating the remaining time period for the active session.

8. The method according to claim 1, wherein the session update request message includes destination host data indicating a destination host, anchor AAA server data indicating the anchor AAA server, serving AAA server data indicating the AAA server connected with the current access node, and session update vector data indicating specific AAA servers having received the session update request message.

9. The method according to claim 8, further comprising setting a flag in the session update vector data when the session update request message passes the anchor AAA server.

10. The method according to claim 8, further comprising setting a flag in the session update vector data when the session update request message passes the home AAA server.

11. The method according to claim 1, further comprising:
producing and transmitting a session update answer message from the anchor AAA server and/or from the AAA server connected with the previous access node;
processing the session update answer message in the AAA server connected with the current access node for updating the session; and
forwarding the session update answer message to the current access node.

12. The method according to claim 11, wherein the session update answer message comprises session information data indicating authentication, authorization and accounting information for the mobile node.

13. The method according to claim 1, wherein the session is based on a Diameter protocol for authentication, authorization and accounting, wherein session related data are transmitted in form of one or more attribute value pairs.

14. A communication network system for updating a session path for a mobile node in a packet based mobile communication network, the network system comprising:
initiating means for initiating a session for the mobile node via one of a plurality of access nodes in the network, a session path from a home authentication, authorization, accounting (AAA) server via a AAA server in whose domain the mobile node initiated the session being established and the AAA server in whose domain the mobile node initiated the session being set as an anchor AAA server for the session;
wherein, when a handover of the mobile node from one previous access node to another current access node is performed during the session,
producing means for producing a session update request message which is transmitted from the current access node via the connected AAA server to the anchor AAA server;
processing means for processing the session update request message in each AAA server receiving the session update request message; and
updating means for updating the session path on the basis of a processing result of the session update request message,
wherein the network includes the plurality of AAA servers used for handling authentication, authorization and accounting requests for the mobile node in a respective domain, wherein one of the AAA servers is the home AAA server of the mobile node, and the plurality of access nodes covering a respective coverage area via which the mobile node communicates within the network, wherein each of the plurality of access nodes is connected with at least one of the plurality of AAA servers.

15. The system according to claim 14, wherein the producing means for producing the session update request message are implemented in each of the plurality of access nodes.

16. The system according to claim 14, wherein in the processing means the processing of the session update request is executed in the AAA server connected with the current access node and in the anchor AAA server.

17. The System according to claim 16, wherein in the processing means the processing of the session update request message is executed in the AAA server connected with the previous access node.

18. The system according to claim 14, further comprising a providing means for providing, when the handover is performed, the current access node with information about the session path pointing to the previous access node, the information identifying the anchor AAA server and/or the AAA server with which the previous access node is connected, wherein the information about the session path is provided before the session update request message is produced.

19. The system according to claim 18, wherein in the providing means the information about the session path is provided to the current access node by means of a context transfer of authentication, authorization and accounting information of the mobile node from the previous access node to the current access node.

20. The system according to claim 18, wherein in the providing means the information about the session path is provided to the current access node by the mobile node.

21. The system according to claim 14, further comprising storing means for storing active session information in the AAA servers involved in the session of the mobile node, wherein the active session information comprises a session identifier, a downstream node indicating a next access node or AAA server in the session path towards the mobile node, and session timeout value indicating the remaining time period for the active session.

22. The system according to claim 14, wherein the session update request message includes destination host data indicating a destination host, anchor AAA server data indicating the anchor AAA server, serving AAA server data indicating the AAA server of connected with the current access node, and session update vector data indicating specific AAA servers having received the session update request message.

23. The system according to claim 22, wherein the processing means for processing the session update request message sets a flag in the session update vector data when the session update request message passes the anchor AAA server.

24. The system according to claim 22, wherein the processing means for processing the session update request message sets a flag in the session update vector data when the session update request message passes the home AAA server.

25. The system according to claim 14, further comprising:
a forwarding means for forwarding a session update answer message to the current access node,
wherein,
the producing means is further configured for producing and transmitting the session update answer message in the anchor AAA server and/or in the AAA server connected with the previous access node; and the processing means is further configured for processing the session update answer message in the AAA server connected with the current access node for updating the session.

26. The system according to claim 25, wherein the session update answer message comprises session information data indicating authentication, authorization and accounting information for the mobile node.

27. The system according to claim 14, wherein the session is based on a Diameter protocol for authentication, authorization and accounting, wherein session related data are transmitted in form of one or more attribute value pairs.

28. A communication network node used for an update of a session path for a mobile node in a packet based mobile communication network, the communication network node comprising:

a producing means for producing a session update request message, when a handover of the mobile node from one previous access node to another current access node is performed during the session, which is transmitted from a current access node via a connected authentication, authorization and accounting (AAA) server to an anchor AAA server, the session update request message comprises information which are processed in each AAA server receiving the session update request message for updating a session path based on a processing result of the session update request message, wherein the communications network includes the plurality of AAA servers used for handling authentication, authorization and accounting requests for the mobile node in a respective domain, wherein one of the AAA servers is the home AAA server of the mobile node, and the plurality of access nodes covering a respective coverage area via which the mobile node communicates within the network, wherein each of the plurality of access nodes is connected with at least one of the plurality of AAA servers, and wherein the session for the mobile node is initiated via one of the plurality of access nodes in the network, the session path from the home AAA server via the AAA server in whose domain the mobile node initiated the session being established and the AAA server in whose domain the mobile node initiated the session being set as an anchor AAA server for the session.

29. The communication network node according to claim 28, wherein the communication network node is the current access node.

30. The communication network node according to claim 28, wherein, when the handover is performed, the communication network node is provided with information about the session path pointing to the previous access node, the information identifying the anchor AAA server and/or the AAA server with which the previous access node is connected before producing and transmitting the session update request message.

31. The communication network node according to claim 30, wherein the information about the session path is provided by a context transfer of authentication, authorization and accounting information of the mobile node from the previous access node to the current access node.

32. The communication network node according to claim 30, wherein the information about the session path is provided by the mobile node.

33. The communication network node according to claim 28, wherein the session update request message includes destination host data indicating a destination host, anchor AAA server data indicating the anchor AAA server, serving AAA server data indicating the AAA server of connected with the current access node, and session update vector data indicating specific AAA servers having received the session update request message.

34. The communication network node according to claim 28, further comprising a processing means for receiving and processing a session update answer message from the anchor AAA server and/or from the AAA server connected with the previous access node for updating the session.

35. The communication network node according to claim 34, wherein the session update answer message comprises session information data indicating authentication, authorization and accounting information for the mobile node.

36. The communication network node according to claim 28, wherein the session is based on a diameter protocol for authentication, authorization and accounting, wherein session related data are transmitted in form of one or more attribute value pairs.

37. A method of producing a message used for requesting a session update for a mobile node in a packet based mobile communication network, the method comprising:

providing a plurality of authentication, authorization and accounting (AAA) servers used for handling authentication, authorization and accounting requests for the mobile node in a respective domain, wherein one of the AAA servers is a home AAA server of the mobile node; and providing a plurality of access nodes covering a respective coverage area via which the mobile node communicates within the network, wherein each of the plurality of access nodes is connected with at least one of the plurality of AAA servers;

wherein, when a session is initiated by the mobile node via one of the plurality of access nodes in the network and a session path is established from the home AAA server via the AAA server in whose domain the mobile node initiated the session, the AAA server in whose domain the mobile node initiated the session is set as an anchor AAA server, and wherein, when a handover of the mobile node from one previous access node to another current access node is performed during the session, inserting in the message destination host data indicating a destination host;

inserting in the message anchor AAA server data indicating the anchor AAA server;

inserting in the message serving AAA server data indicating the AAA server connected with the current access node; and inserting in the message session update vector data indicating specific AAA servers having received the session update request message.

38. The method according to claim 37, wherein the method is executed in the current access node.

39. The method according to claim 37, wherein the session update vector data comprise a flag which is set when the message passes the anchor AAA server, and/or a flag which is set when the message passes the home AAA server.

40. The method according to claim 37, wherein the session is based on a diameter protocol for authentication, authorization and accounting, wherein session related data are transmitted in form of one or more attribute value pairs.

41. A method of producing a message used for answering to a message for requesting a session update according to claim 37, wherein the message for answering is produced in the anchor AAA server and/or in the AAA server connected with the previous access node, the method further comprising:
- copying from the request message the serving AAA server data indicating the AAA server connected with the current access node; and
- inserting in the message session information data indicating authentication, authorization and accounting information for the mobile node.

42. The method according to claim 41, wherein the session is based on a Diameter protocol for authentication, authorization and accounting, wherein session related data are transmitted in form of one or more attribute value pairs.

43. A method of updating a session path for a mobile node in a packet based mobile communication network, the method comprising:
- providing a plurality of AAA servers used for handling authentication, authorization and accounting requests for the mobile node in a respective domain, wherein one of the AAA servers is a home AAA server of the mobile node;
- providing a plurality of access nodes covering a respective coverage area via which the mobile node communicates within the network, wherein each of the plurality of access nodes is connected with at least one of the plurality of AAA servers;
- initiating a session by the mobile node via one of the plurality of access nodes in the network;
- establishing a session path from the home AAA server via the AAA server in whose domain the mobile node initiated the session;
- wherein, when a handover of the mobile node from one previous access node to another current access node is performed during the session;
- producing and transmitting a session update request message from the current access node to the connected AAA server; and
- updating the session path in the connected AAA server to the current access node on the basis of the session update request message.

44. A communication network system for updating a session path for a mobile node in a packet based mobile communication network, the network system comprising:
- initiating means for initiating a session for the mobile node via one of a plurality of access nodes in the network, a session path from the home authentication, authorization and accounting (AAA) server via the AAA server in whose domain the mobile node initiated the session being established;
- wherein, when a handover of the mobile node from one previous access node to another current access node is performed during the session, the system comprises:
- producing means for producing a session update request message which is transmitted from the current access node to the connected AAA server; and
- processing means for processing the session update request message in the connected AAA server and for updating the session path on the basis of a processing result of the session update request message,
- wherein the network includes the plurality of AAA servers used for handling authentication, authorization and accounting requests for the mobile node in a respective domain, wherein one of the AAA servers is the home AAA server of the mobile node; and
- the plurality of access nodes configured to cover a respective coverage area via which the mobile node communicates within the network, wherein each of the plurality of access nodes is connected with at least one of the plurality of AAA servers.

45. A method of updating a session path for a mobile node in a packet based mobile communication network, the method comprising:
- providing a plurality of AAA servers used for handling authentication, authorization and accounting requests for the mobile node in a respective domain, wherein one of the AAA servers is a home AAA server of the mobile node;
- providing a plurality of access nodes covering a respective coverage area via which the mobile node communicates within the network, wherein each of the plurality of access nodes is connected with at least one of the plurality of AAA servers;
- initiating a session by the mobile node via one of the plurality of access nodes in the network;
- establishing a session path from the home AAA server via the AAA server in whose domain the mobile node initiated the session;
- setting the AAA server in whose domain the mobile node initiated the session as an anchor AAA server;
- wherein, when a handover of the mobile node from one previous access node to another current access node is performed during the session; and
- producing a session update request message,
- wherein the session update request message is transmitted from the current access node via the connected AAA server to the anchor AAA server, when the current access node and the previous access node are connected with respective different AAA servers, or the session update request message is transmitted from the current access node to the connected AAA server, when the current access node and the previous access node are connected with the same AAA server;
- processing the session update request message in each AAA server receiving the session update request message; and
- updating the session path on the basis of a processing result of the session update request message.

46. A communication network system for updating a session path for a mobile node in a packet based mobile communication network, the network system comprising:
- initiating means for initiating a session for the mobile node via one of a plurality of access nodes in the network, a session path from a home authentication, authorization and accounting (AAA) server via a AAA server in whose domain the mobile node initiated the session being established and a AAA server in whose domain the mobile node initiated the session being set as an anchor AAA server for the session;
- wherein, when a handover of the mobile node from one previous access node to another current access node is performed during the session,
- producing means for producing a session update request message which is transmitted from the current access node via the connected AAA server to the anchor AAA server, when the current access node and the previous access node are connected with respective different AAA servers, or which is transmitted from the current access node to the connected AAA server, when the current access node and the previous access node are connected with the same AAA server;
- processing means for processing the session update request message in each AAA server receiving the session update request message; and updating means for updating the session path on the basis of a processing result of the session update request message, wherein the plurality of AAA servers used for handling authentication, authorization and accounting requests for the mobile node in a respective domain, wherein one of the AAA servers is the home AAA server of the mobile node; and the plurality of access nodes covering a respective coverage area via which the mobile node communicates within the network, wherein each of the plurality of access nodes is connected with at least one of the plurality of AAA servers.

47. A communication network node used for an update of a session path for a mobile node in a packet based mobile communication network, the communication network node comprising:

a producing means for producing a session update request message, when a handover of the mobile node from one previous access node to another current access node is performed during a session, which is transmitted from a current access node via a connected authentication, authorization and accounting (AAA) server to an anchor AAA server, when the current access node and the previous access node are connected with respective different AAA servers, or which is transmitted from the current access node to the connected AAA server, when the current access node and the previous access node are connected with the same AAA server, the session update request message comprises information which are processed in each AAA server receiving the session update request message for updating the session path based on a processing result of the session update request message, wherein the communication network includes the plurality of AAA servers used for handling authentication, authorization and accounting requests for the mobile node in a respective domain, wherein one of the AAA servers is the home AAA server of the mobile node, and the plurality of access nodes covering a respective coverage area via which the mobile node communicates within the network, wherein each of the plurality of access nodes is connected with at least one of the plurality of AAA servers, wherein the session for the mobile node is initiated via one of the plurality of access nodes in the network, a session path from the home AAA server via the AAA server in whose domain the mobile node initiated the session being established and the AAA server in whose domain the mobile node initiated the session being set as the anchor AAA server for the session.

* * * * *